US010961825B2

(12) United States Patent
Rosano et al.

(10) Patent No.: US 10,961,825 B2
(45) Date of Patent: Mar. 30, 2021

(54) DRILLING RIG

(71) Applicant: NATIONAL OILWELL VARCO NORWAY AS, Kristiansand (NO)

(72) Inventors: Hugo Leonardo Rosano, Kristiansand (NO); Stig Vidar Trydal, No (NO); Erik Haavind, No (NO); Frode Jensen, No (NO)

(73) Assignee: NATIONAL OILWELL VARGO NORWAY AS, Kristiansand (NO)

( * ) Notice: Subject to any disclaimer, the term of this patent is extended or adjusted under 35 U.S.C. 154(b) by 734 days.

(21) Appl. No.: 15/526,616

(22) PCT Filed: Nov. 13, 2015

(86) PCT No.: PCT/GB2015/053458
§ 371 (c)(1),
(2) Date: May 12, 2017

(87) PCT Pub. No.: WO2016/075487
PCT Pub. Date: May 19, 2016

(65) Prior Publication Data
US 2017/0314369 A1 Nov. 2, 2017

(30) Foreign Application Priority Data
Nov. 14, 2014 (GB) .................................. 1420292

(51) Int. Cl.
E21B 41/00 (2006.01)
E21B 19/00 (2006.01)
(Continued)

(52) U.S. Cl.
CPC .......... *E21B 41/0092* (2013.01); *E21B 19/00* (2013.01); *F16P 3/142* (2013.01);
(Continued)

(58) Field of Classification Search
CPC .. G06K 9/00771; G06K 9/627; H04N 13/243; H04N 13/271
(Continued)

(56) References Cited

U.S. PATENT DOCUMENTS 9,396,398 B2 * 7/2016 Kozicz ............... G06K 9/00369
2010/0111404 A1 * 5/2010 Bobbitt .............. G06K 9/00771
382/159

(Continued)

FOREIGN PATENT DOCUMENTS

GB 2532272 A 5/2016
WO 2011/0108945 A2 9/2011
(Continued)

OTHER PUBLICATIONS

McConnell, "Improving Safety Around Machine Tools and Mechanized Equipment Building a Successful Program", 2005 (Year: 2005).*
(Continued)

*Primary Examiner* — Nasser M Goodarzi
*Assistant Examiner* — Jaycee Imperial
(74) *Attorney, Agent, or Firm* — Schwegman Lundberg & Woessner, P.A.

(57) ABSTRACT

A system comprising a drilling rig having a rig floor, a derrick, a master control computer system and at least one camera, the at least one camera capturing a master image of at least a portion of the rig floor, sending the master image to the master control computer, the master control computer system mapping said master image into a model to facilitate control of items on said drilling rig.

20 Claims, 27 Drawing Sheets

(51) Int. Cl.
*F16P 3/14* (2006.01)
*G06K 9/00* (2006.01)
*H04N 13/271* (2018.01)
*H04N 13/243* (2018.01)
*G06K 9/62* (2006.01)

(52) U.S. Cl.
CPC ......... *G06K 9/00771* (2013.01); *G06K 9/627* (2013.01); *H04N 13/243* (2018.05); *H04N 13/271* (2018.05); *G06K 2209/19* (2013.01)

(58) Field of Classification Search
USPC .......................................................... 348/84
See application file for complete search history.

(56) References Cited

U.S. PATENT DOCUMENTS

| | | | |
|---|---|---|---|
| 2010/0321485 A1 | 12/2010 | Pool | |
| 2011/0025852 A1* | 2/2011 | Tanaka | G07C 9/00071 |
| | | | 348/156 |
| 2011/0259258 A1* | 10/2011 | DePiero | E02F 9/0858 |
| | | | 116/200 |
| 2013/0120547 A1* | 5/2013 | Linnell | H04N 13/393 |
| | | | 348/61 |
| 2013/0275100 A1* | 10/2013 | Ellis | G06F 17/5009 |
| | | | 703/2 |
| 2014/0341427 A1* | 11/2014 | Kawano | G06K 9/00255 |
| | | | 382/103 |
| 2015/0146921 A1* | 5/2015 | Ono | H04N 7/18 |
| | | | 382/103 |
| 2015/0271522 A1* | 9/2015 | Panahpour Tehrani | |
| | | | H04N 19/597 |
| | | | 375/240.12 |
| 2016/0156880 A1* | 6/2016 | Teich | H04N 5/225 |
| | | | 348/82 |
| 2016/0292513 A1 | 10/2016 | Kozicz et al. | |
| 2017/0289606 A1* | 10/2017 | Tumanov | H04N 21/251 |

FOREIGN PATENT DOCUMENTS

| | | | | |
|---|---|---|---|---|
| WO | WO-2013108686 A1 * | 7/2013 | ............ | G06T 7/246 |
| WO | WO-2014057988 A1 * | 4/2014 | ............ | H04N 19/132 |
| WO | 2014/0182887 A1 | 11/2014 | | |
| WO | 2014190081 A1 | 11/2014 | | |
| WO | WO-2016036338 A1 * | 3/2016 | ............ | H04N 21/251 |
| WO | WO-2016075487 A1 | 5/2016 | | |

OTHER PUBLICATIONS

Nguyen et al., Apr. 10, 2020, "A Systematic Review of Big Data Analytics for Oil and Gas Industry" (Year: 2020).*

Rolloos Oil & Gas, Feb. 13, 2020, "Red Zone Monitoring for Drilling Rigs", https://www.rolloos.com/en/solutions/cctv/red-zone-monitoring/ (Year: 2020).*

UK Search Report dated Feb. 23, 2015 for UK Application No. GB1420292.3, filed Nov. 14, 2014.

International Search Report and Written Opinion dated Apr. 11, 2016 for PCT/GB2015/053458, filed on Nov. 13, 2015.

IADC/SPE 168021—Multi-Machine Control Leads to Improved Rig Layout—XP055242134.

"International Application Serial No. PCT/GB2015/053458, Interantional Preliminary Report on Patentability dated May 26, 2017", 11 pgs.

"United Kingdom Application Serial No. 1420292.3, Preliminary Examination Report dated Nov. 19, 2014", 2 pgs.

* cited by examiner

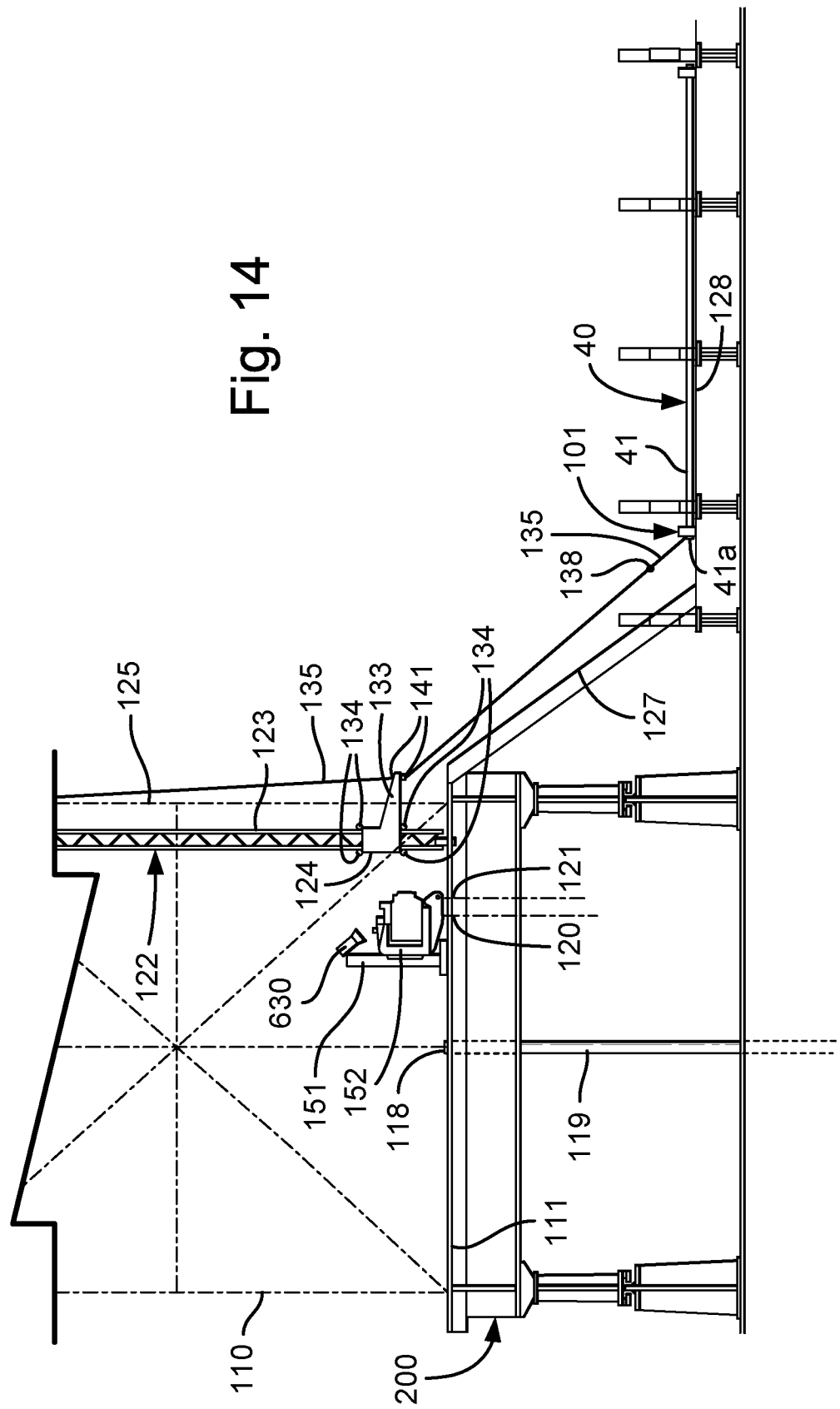

DRILLING RIG

The present invention relates to a drilling rig and a system of operating a drilling rig and particularly, but not exclusively to a system for mitigating collisions on a drilling rig, a system for mitigating accidents on a drilling rig and a system for monitoring the health of tools on the rig floor.

In the drilling of a wellbore a drill bit is arranged in a bottom hole assembly on the lower end of a drill string. The drill bit is rotated to bore a hole in a formation. The formation may be below water or may be dry land. An upper end of the drill string passes through an opening in a drill floor of a drilling rig. The opening is known as well centre. The drill string is constructed on a drilling rig and then lowered into the hole using a wireline drawn-in and let-out by a winch known as a drawworks. The wireline passes over a crown block fixed to the top of a derrick, and passes down to a travelling block which travels up and down within the derrick to raise or lower joints of drill pipe and/or the entire drill string.

The drill bit is, at least initially, rotated by rotation of the drill string. The drill string may be rotated by a rotary table arranged at well centre in the drill floor. In this case, a swivel is hooked on to the travelling block, which has an elevator attached thereto in which the drill string is held for lowering and raising. Alternatively or additionally, the drill string may be rotated by a top drive movable up and down a track in a derrick of the drilling rig. The travelling block is connected to the top drive to raise and lower the top drive along the track. A top drive elevator depends from the top drive on bails. As the hole is drilled, joints of drill pipe are added to the drill string to allow the drill bit to drill deeper into the formation. The joints of drill pipe are usually added in stands of two or more usually three joints. The stands of drill pipe are made up off well centre in a mouse hole or powered rat hole. The stands are made up using an iron roughneck or: a separate spinner to run threaded pin ends of a upper joint of drill pipe into corresponding threaded boxes of a lower joint of drill pipe to make a connection; and a tong to torque the connection. Pipe handling apparatus moves joints of pipe from a pipe rack into alignment with the mouse hole or rat hole. Another pipe handling apparatus moves the stand of dill pipe directly to well centre for connection to the drill string or into a rack comprising slots defined by fingers in an array known as a finger board for buffer storage, such a rack and pipe handling apparatus are disclosed in U.S. Pat. No. 8,550,761-B2, the disclosure of which is incorporated herein for all purposes. The stand of drill pipe is then connected to the string of drill pipe suspended in the hole. The connection is made using an iron rough neck or a separate spinner and tongue.

It is also know from WO 2011/135311 to have a system for determining the position of a downhole drill pipe relative to an iron roughneck. The system comprises: an imaging means arranged to capture an image of the drill pipe in a region of the pipe for engagement by the device; and a processor operable to analyse said captured image and to determine therefrom the position of the drill pipe relative to the iron roughneck.

The drill string is removed from the well, in a procedure known as "tripping-out". Typically, the top drive elevator lifts a stand length of drill pipe out of the hole. The spider in the rig floor at well centre prevents the rest of the drill string from falling downhole. The stand length of drill pipe is disconnected from the drill string using an iron roughneck. The stand is "set-back" in the finger board.

To improve the integrity of the hole, the hole may be lined with casing. A string of casing is lowered into the hole and hung from a wellhead or template on the surface of the formation. During construction of the casing string a section of casing is added to the casing string as it is lowered into the hole. The section of casing is moved into alignment with a pipe handling apparatus or an elevator is used to lift the upper end from a conveyor so that the lower end swings into alignment with well centre and the casing string suspended in the hole. The section of casing is then connected to the string of casing suspended in the hole. The connection is made using: a casing iron rough neck, separate casing spinners and tongues; or using a casing running tool (CRT) using rotation of the top drive whilst torque is resisted by the casing string being held in a spider in the floor of the drilling rig. Once the string of casing is complete, it is hung from the template or wellhead. Centralizers may be used to centre the casing in the hole.

The casing may be cemented in place.

The drill bit and drill string are "tripped-in" to the well. The drill bit on a BHA and subsequently stands of drill pipe from the finger boards are moved to well centre one at a time using the pipe handling arm and connected in the same procedure as described above, except for the fact that the hole is pre-drilled and cased, so the procedure is carried out at a much quicker pace than when drilling.

Drilling then continues. When the drill string is long, it is difficult to transfer torque from the top drive or rotary table to the drill bit. A mud motor may be used. The mud motor is installed near to the bottom hole assembly. The circulation of drilling mud through the mud motor rotates the drill bit.

More, smaller diameter casings may be installed and cemented in place as the hole is drilled further. Furthermore, a liner may be set, which is a casing which is not tied back to the wellhead, but hung from the lower end of a previously hung casing.

Lateral holes may be formed from the main hole, using tools such as window mills and whipstocks. The lateral holes can extend several kilometres from the main hole.

Specialist tools may be required during the drilling process, such as a continuous circulation tool, such as the one shown in WO-98/16716 and WO 2009/093069. These tools are brought up to the rig floor and placed at well centre. The continuous circulation tool is then connected into the drill string between the rig floor and an upper sub connected to a top drive. These tools allow a continuous circulation of drilling mud whilst dill pipe is added or taken away during tripping and thus maintains a constant pressure in the wellbore.

The hole may then be cleaned using cleaning tools on the end of a drill string and made ready for receiving oil from the formation, known as the production phase.

Various operations can be carried out during the production phase, such as work over and well stimulation operations to attempt to obtain more oil from the well. These operations may be carried out using coiled tubing and tools connected thereto. These operations may be carried out from the well head or the rig floor.

Thus several standard operations are carried out during the construction and production phases over the life of a well, such as: drilling phase; tripping-out phase; casing phase; tripping-in phase; completion phase; production phase; and intervention phase; as well as specialist operations. Different tools are required for each phase and thus tools are changed over on the rig floor between phases.

The inventors have also observed that if a tool used on a rig floor becomes faulty, the rig operations often have to cease whilst men retrieve and replace the faulty tool. Significant down time can occur. This is particularly, but not exclusively relevant in a dual derrick system, where operations switch from drilling, to casing to completion etc. very quickly and frequently, thus a lot of time is lost as "flat time", whilst changing the configuration of tools at the well centres.

The inventors have observed that there is a risk of collision between tools, equipment and other items on a rig floor of a drilling rig. The inventors have also observed that drillers and tool pushers overly estimate the size of items such as tools, pipe and equipment moving on around a drilling rig in order to avoid collisions. Furthermore, the speed at which tools, equipment and other items are moved around a rig floor is often overly reduced by the drillers and tool pushers to mitigate collisions. Furthermore, the inventors have observed that rig hands on the rig floor are in potential danger when in close proximity to tools in operation and when tools and equipment are moved around a drilling rig.

In accordance with the present invention there is provided a system for operating a drilling rig, the system comprising a drilling rig having a rig floor, a derrick, a master control computer system and at least one camera, the at least one camera capturing a master image of at least a portion of the rig floor, sending the master image to the master control computer, the master control computer system mapping said master image into a model for a zone management system.

Preferably, the master image is constructed from a plurality of sub-images, each sub-image captured by a camera.

Preferably, the master image is analysed by the master control computer system to obtain three dimensional model. Advantageously, the master image comprises a grey scale contrast or colour contrast, preferably the master control computer system analysis said contrast to produce said model. Preferably, the camera captures range data, the range data used to defining points for said model.

Preferably, the model is created in real time. Advantageously, the master image is captured at least once every minute and an updated model created in real time. Preferably, the master image is captured at least once every second and an updated model created in real time. Advantageously, the master image is captured at least ten times every second and an updated model created in real time. An algorithm can be used to reduce the need for computing power and increasing speed of processing by identifying areas of the model which have changed and only updating the changing parts of the model, for example using block matching used in MPEG-2.

Advantageously, the model is used in a collision mitigation system. Preferably, the model is used in a system for mitigating accidents on a drilling rig. Advantageously, the model is used in a health check system.

The present invention also provides a system for mitigating collisions on a drilling rig, the drilling rig comprising a rig floor and a derrick, the system comprising a plurality of cameras, each camera of said plurality of cameras capturing an image of a zone on a rig floor in real time and sending the image to a master computer system, the master computer system processing said image of the zone and based on the content of said image allow or disallow an item to move into or within a particular part of said zone.

Advantageously, at least one of said plurality of cameras is mounted in the derrick providing a plan view of the rig floor. Preferably, the camera is arranged on a track and movable therealong. Advantageously, the camera is movable on a universal joint, which may be provided with means such as a grub screw to lock the universal joint in one position. The camera may be movable by remote control to select a field of vision.

Advantageously, the master computer system scans said image for items. Preferably, the analysis comprises the steps of scanning the image for items, each item having an item image stored in a memory of the master computer system. For example, an item image is a top plan view of an iron roughneck, well centre, a spider, a spider skid, a dog house skid etc. Advantageously, the system further comprises the step of the master computer system plotting a location for each identified item on said map. Advantageously, a default unsafe zone is stored in said master computer system for each of said at least one item image. Preferably, an in-use unsafe zone is stored in the master control system for each of said at least one item image, advantageously the master control computer system is provided with realtime data indicating if said item is operating and preferably particulars of the type of operation.

Preferably, the system comprises a plurality of item skids moving on said rig floor. Advantageously, each item skid comprises information gathering devices, such as at least of a: location sensor, orientation sensor, ID tag reader; weight sensor; memory, where preferably information from the information gathering devices is collated and processed by said master computer system. Preferably, the skid further comprises an on-board computer system for collating data information from said plurality of information gathering devices.

Advantageously, the skids are arranged on a network of rails.

Preferably, said image is digital, although may be an analogue image. Preferably, a high definition analogue camera is used in combination with a range data collecting apparatus, which may be light based, such as a time of light laser, differential path or be sound based, such as sonar. Advantageously, said image comprises or is wholly built up from range data, such that a three dimensional image is captured and sent to the master computer system. Preferably, the range data is measured for each hundred square millimetres of the zone.

Advantageously, the camera is a range imaging camera. Preferably, the camera is a range imaging camera is one of the following types: time-of-flight, stereo triangulation, sheet of light triangulation type, structured light type.

Preferably, the image is captured every one to five minutes. Advantageously, the image is captured every ten seconds to sixty seconds. Preferably, the image is captured every one to ten second. Advantageously, image is captured between fifty and one times per second.

Most equipment moving around the rig is equipped with sensors that report position and intended motion to a master computer control system.

Rig hands on a rig floor are needed to fulfil a number of tasks, such as moving and operating tools, inspection, maintenance, problem solving etc. Rig hands are managed by the driller or tool pusher, but not to the extent their position on the drilling rig is always known. Thus their location at any point in time is not necessarily known by the driller, tool pusher or master computer control system running automated operations and tools on the drilling rig.

The rig hands always wear safety helmets on the rig floor. This is a mandatory safety requirement and rig hands are used to following this procedure. A location device and transmitter may be installed in the rig hand's safety helmet to transmit a signal back to a receiver linked to the master computer control system. The master computer control system is provided with an algorithm to assess the rig hand's location on the rig floor which is continuously monitored. In this way, potentially dangerous operations can be delayed or stopped if the rig hand is within an unsafe zone at the location of and around the potentially dangerous operation. The inventors have observed that this system is very useful, but could benefit from a more robust alternative or additional system. In accordance with another aspect of the present invention there is provided a system for mitigating accidents and optionally, mitigating down time on a drilling rig, the drilling rig comprising a rig floor and a derrick, the system comprising a plurality of cameras, each camera of said plurality of cameras capturing an image of a zone on a rig floor in real time and sending the image to a master control computer system, the master control computer system processing said image of the zone analysing said image to detect the presence of a rig hand, the master control system having a map of unsafe zones about items on the drilling rig and assessing if the rig hand is within said unsafe zone and based on said assessment allowing or disallowing an item to operate in or be conveyed into said unsafe zone.

A rig hand has a number of identifiable signatures which do not vary considerably from one rig hand to another, but do vary considerably from other objects found on a rig floor. Such a feature is the helmet. Another feature is the face of the rig hand. Another is the rig hands heat signature.

Preferably, the map of unsafe zones is obtained by analysing an image obtained from a camera, which may be different or the same cameras. Advantageously, the analysis comprises the steps of scanning the image for items which stored in a memory. Preferably, the scanning comprises holding at least one item image and scanning said image for said at least one item image, and advantageously plotting a location for each identified item on said map. Advantageously, a default unsafe zone is stored in said master control computer system for each of said at least one item image. Preferably, an in-use unsafe zone is stored in the master control system for each of said at least one item image, advantageously the master control computer system is provided with realtime data indicating if said item is operating and preferably particulars of the type of operation.

Optionally, the camera is a heat sensing camera for optionally identifying inanimate objects and optionally identifying rig hands. The master control computer system may comprise an algorithm for filtering out parts of the obtained images which are not likely to be rig hands. For example, the structure of the drilling rig has a heat signature which is very different to that of a rig hand and thus the master computer control system filters out large parts or all of the image. Certain movable machines, such as an iron roughneck, has a heat signature which is very different to that of a rig hand and thus the master control computer system filters out large parts or all of the image. Furthermore, certain known items are static and always present of a rig floor, such as a derrick, towers, racks, drawworks, dog house etc. Details of these known items may be contained in a known items database. The computer system may be provided with an additional algorithm to filter out parts of the image of those details held in the known items database. The parts of the image that are left are then analysed using further algorithms. The system thus comprises or further comprises a heat sensing camera such as a thermal imaging camera. The master computer control system may further comprise a database of known heat signature profiles for machines or any other object likely to be found on a rig floor. The master control computer system may be provided with an algorithm to compare the obtained heat signature profiles with those in the database to discount them from being a rig hand.

Rig hands generally have an identifiable heat pattern signature. The master computer control system is optionally provided with an algorithm to assess if there is a heat pattern which is indicative of a rig hand. The master computer control system is also provided with an algorithm to assess the location of the heat pattern indicative of a rig hand on the rig floor. Optionally, the thermal imaging capers is provided with a range imaging device, which facilitates obtaining a location co-ordinate on the rig floor.

A rig hand has certain identifiable visible signatures which do not vary considerably from one rig hand to another. Such a rig hand feature is a helmet, face or facial features. It is thus preferable for the system to have a camera for receiving reflected visible light information to assess a visible signature of at least part of the rig hand. Optionally, the system also comprises a heat sensing camera for detecting a heat signature of a rig hand and/or to discount items in the field of view of the camera of items not matching the heat signature of the rig hand. Such items are inanimate objects, such as structure in the rig floor area and operating machines. If the two results (light and heat sensing) are positive, it is highly likely that the system has identified a rig hand. If only one of the two cameras (light and heat sensing) identifies a rig hand, the system assumes there is indeed a rig hand in that location. In this way, the system has more redundancy and less likely to allow an operation within an unsafe zone to be carried out.

For example, a rig hand may be wearing a fire resistant suit which may be highly insulated and thus not allow a rig hand's heat signature to be detected by the heat sensing camera. However, the light sensing camera will detect the rig hand from his outline profile signature or part of the outline, for example, the outline of his helmet. Furthermore, in inclement weather conditions, such as thick fog or heavy rain, the light sensing camera may not be able to identify the outline profile of the rig hand, but will be able to identify the rig hand's heat signature.

The master computer control system may be provided with an algorithm to keep a tally of rig hands on the rig floor. Optionally, the master computer control system also comprises an algorithm to compare the tally with the number of rig hands located using the system of the invention on the rig floor. If the numbers are not equal, a further rig hand signature is looked for or the tool pusher or driller is alerted. The master computer control system may also be provided with the number of the helmet location devices active on the rig floor as a further check.

Analysing images in series and keeping a continuous update of rig hand's location will also add robustness to the preferred solution. Most drilling rigs have specific walking rails or platforms to enter and exist working areas. Start tracking on this defined corridors or gates would remove uncertainty on the topic of person vs machine. A system that passes people information position from one image frame to the other will propagate location from areas of high certainty to those of higher uncertainty.

Information from the rig hand tracking system can then be combined with that of all the machine positions for a complete anti-collision system. Therefore, mitigating accidents and reducing downtime.

Optionally, the camera may also captures wavelengths in the infrared range. Infrared reflectors may be worn by the rig hands for producing reflected light for the camera to detect and produce an image thereof.

In accordance with another aspect of the invention, there is provided a system for mitigating accidents on a drilling rig, the drilling rig comprising a rig floor and a derrick and a plurality of entrances to the rig floor the system comprising at least one camera at each of the plurality of entrances, each camera capturing an image of a rig hand or item passing through the respective entrance in real time and sending the image to a master control computer system, the master control computer system processing said image of the rig hand or object executing an algorithm to assess if said image comprises the presence of a rig hand, the master control system maintaining a tally of rig hands on the rig floor. Optionally, a further camera may be required for assessing when a rig hand exits the entrance to the rig floor.

In accordance with another aspect of the present invention there is provided a system for monitoring the health of a tool on a drilling rig the system comprising a camera positioned to monitor said tool and a health check computer control system having at least one reference image stored therein, the camera sending a real time image of said tool to said health check computer control system, said master computer control system comparing said real time image with said at least one reference image, noting differences, and sending a signal to a health check computer if the difference is likely to affect the health of the tool.

Advantageously, the health check computer sends a signal to the tool to cease operation. Preferably, the health check computer sends a signal to a group of tools including the tool to cease operation. Advantageously, the health check computer sends a signal to an interface, such as a visual display, to alert the driller or tool pusher or operator of the tool if a difference is noted which is likely to affect the health of the tool.

Advantageously, the health check computer is loaded with algorithms to difference is likely to affect the health of the tool. Preferably, the algorithms comprise a colour differentiation algorithm. Advantageously, the health check camera includes a range measuring apparatus, the system comprising measuring and recording range data in said reference image, the algorithms comprising a range comparison algorithm for assessing differences in range. Advantageously, the range data comprises relative ranges, such as the depth of a crack which was not apparent in the reference image.

Preferably, the tool is one of an: elevator; top drive system, iron roughneck; crown block; travelling block; cranes; pipe tail handlers; equipment skids; tool skids; dog house skids.

Range imaging cameras are used to create a three dimensional representation of the rig floor. A number of cameras are installed around the rig floor.

The range imaging cameras may be a stereo triangulation type in which two spaced cameras are pointed to the same spot on the rig for determining the depth to points in the scene.

The range imaging camera may be a sheet of light triangulation type wherein the zone is illuminated with a sheet of light which creates a reflected line as seen from the light source. From any point out of the plane of the sheet the line will typically appear as a curve, the exact shape of which depends both on the distance between the observer and the light source, and the distance between the light source and the reflected points. By observing the reflected sheet of light using a high resolution camera and knowing the positions and orientations of both camera and light source, it is possible to determine the distances between the reflected points and the light source or camera. By moving either the light source (and normally also the camera) or the scene in front of the camera, a sequence of depth profiles of the scene can be generated. These can be represented as a 2D range image.

The range imaging camera may be a structured light type, wherein the zone is flooded with a specially designed light pattern, structured light, depth can be determined using only a single image of the reflected light. The structured light can be in the form of horizontal and vertical lines, points or checker board patterns.

The range imaging camera may be a time-of-flight technique, wherein a light pulse is used to, preferably with the entire zone captured with a single light pulse, although point-by-point rotating laser beam is an option. Time-of-flight cameras capture the whole zone in three dimensions with a dedicated image sensor, and therefore have no need for moving parts. A time-of-flight laser radar with a fast gating intensified CCD camera may achieves millimetre depth resolution. With this technique a short laser pulse illuminates the zone, and the intensified CCD camera opens its high speed shutter only for a few hundred picoseconds. The 3D information is calculated from a 2D image series that was gathered with increasing delay between the laser pulse and the shutter opening.

Preferably, the rig floor is located in a drilling rig. Advantageously, the rig floor is locate in one of: a drill ship; FPSO; SWATH; tensioned leg platform; and land rig.

The present invention also provides a system comprising at least one range imaging camera arranged in a rig structure of a drilling rig and a master control computer system, the at least one range imaging camera capturing images and ranges of a rig floor said images and ranges uploaded to a master computer control system.

For a better understanding of the present invention, reference will now be made, by way of example, to the accompanying drawings, in which:

FIG. 14 is a side view of part of a land drilling rig in accordance with the present invention having a rig floor, the drilling rig in a first stage of operation;

Figure 1:
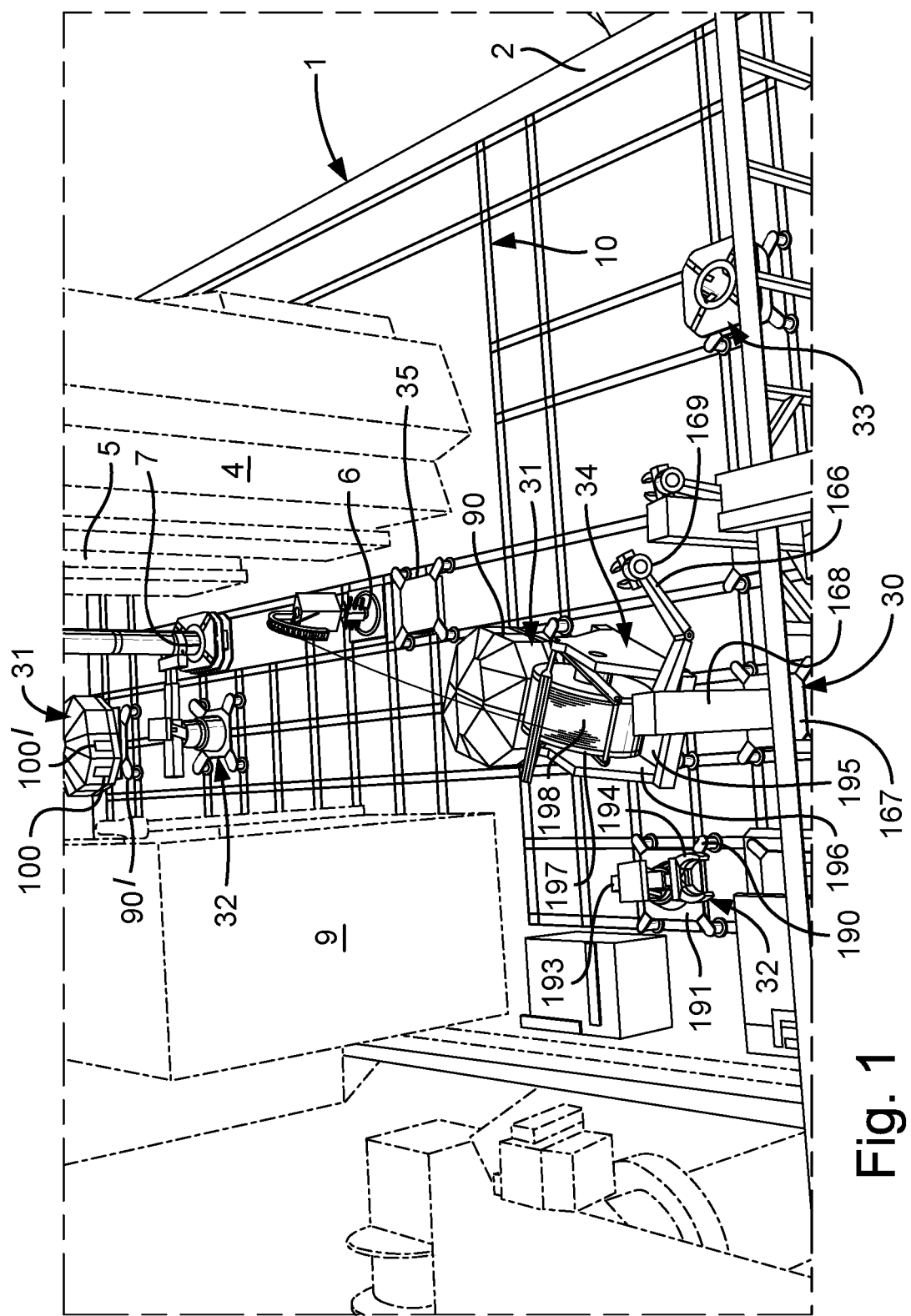
FIG. 1 is a perspective view of part of a drill ship having a rig floor in accordance with the present invention showing inter alia a network of rails and plurality of skids, the view as seen from a camera forming part of the invention.
Figure 2:
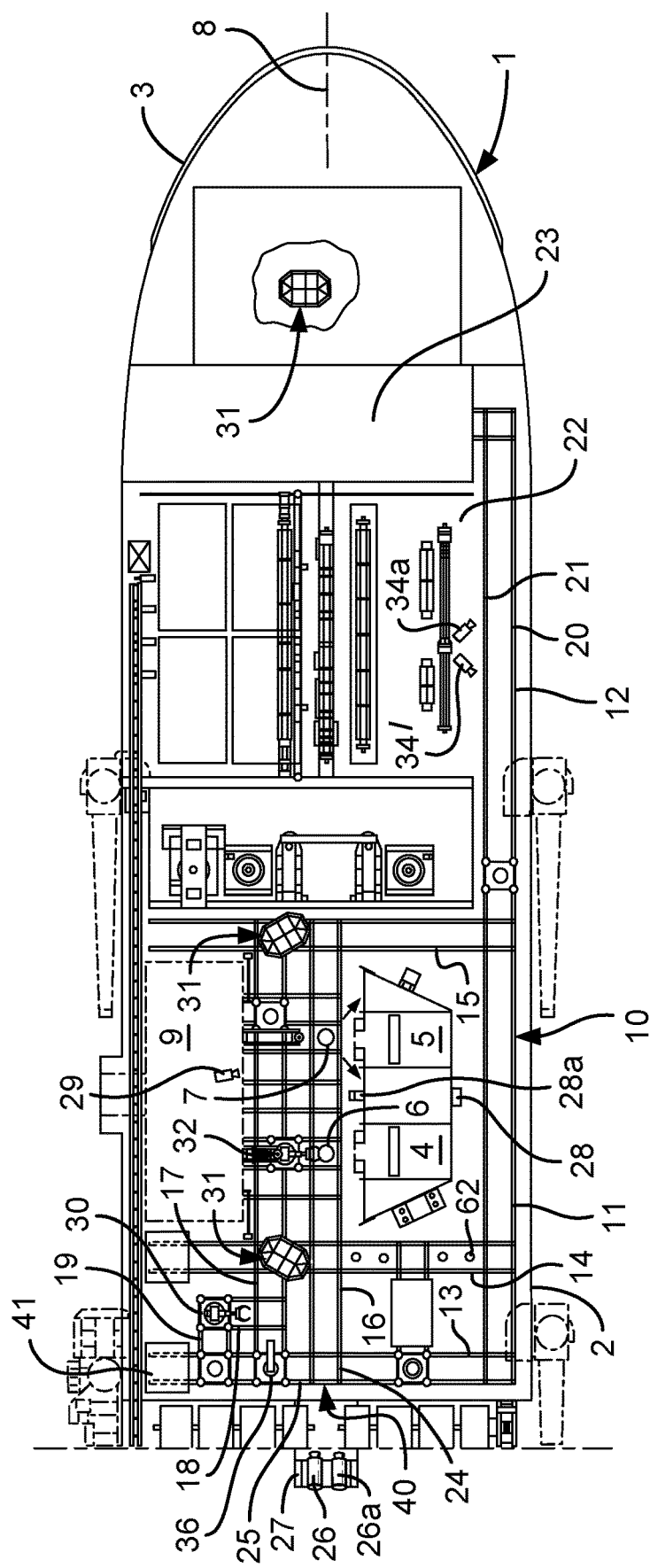
FIG. 2 is a schematic top plan view of part of the drill ship shown in FIG. 1.
Figure 3:
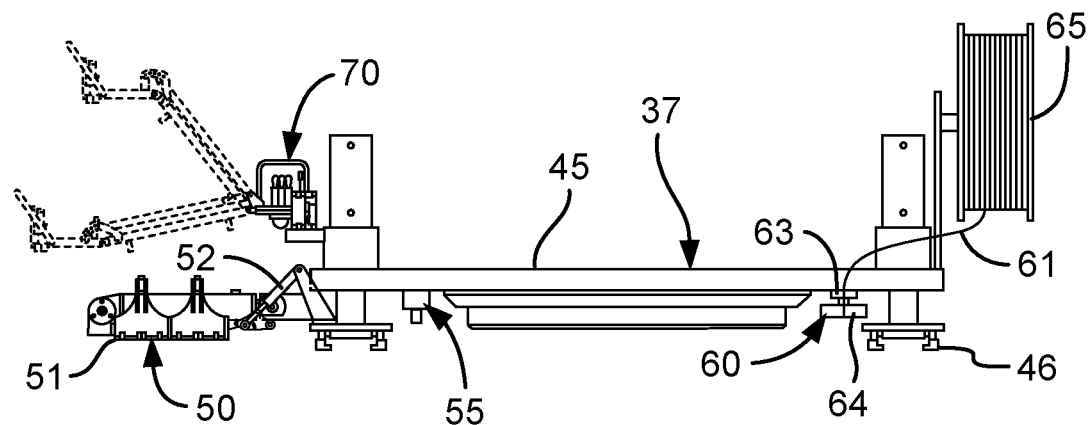
FIG. 3 is a side view of a spider skid for use on the network of rails.
Figure 4:
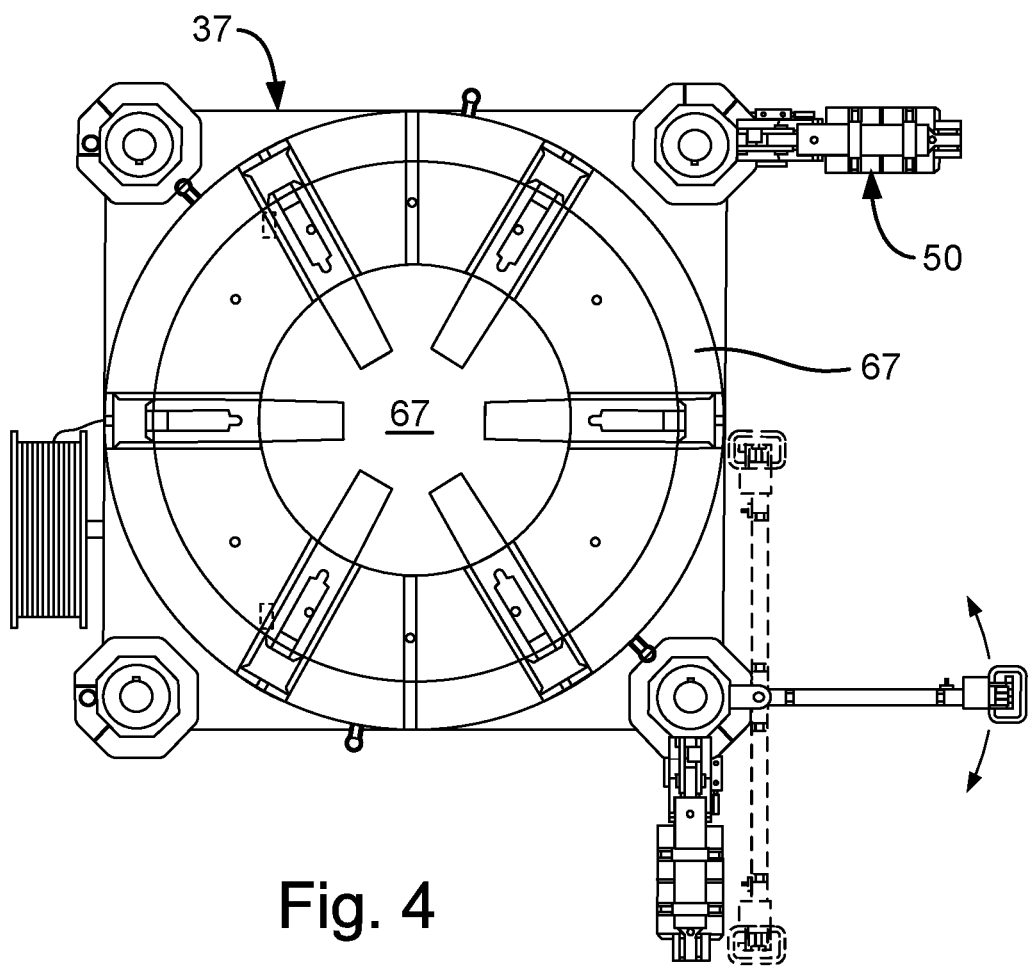
FIG. 4 is a top view of the spider skid shown in FIG. 3 with a spider thereon.

Referring to FIGS. 1 and 2, there is shown part of a drill ship, generally identified by reference numeral 1 having a rig floor 2 in accordance with the present invention. The perspective view of FIG. 1 is as seen from a camera 26 on a rig structure in an aft of the drill ship 1 of amidships looking towards the bow 3. The drill ship 1 has two derricks 4 and 5 arranged on a starboard side of the drill ship 1, each with a corresponding well centre 6 and 7 located substantially along a centreline 8 of the drill ship 1. The top plan view of FIG. 2 is as seen from a camera 28 looking down from a high point on the derrick mast 4 and 5. The camera 28 may comprise several cameras, the images obtained from which are combined to form a composite image. This may be beneficial to obtain a view of the rig floor 2 without obstruction from structures rising therefrom. A pipe handling and make-up structure 9 is arranged on a port side of the drill ship 1. The rig floor 2 is arranged between and about the two derricks 4 and 5. The rig floor 2 surrounds the two derricks 4 and 5. A network of rails 10 is arranged in the rig floor 2. The network of rails 10 comprise a plurality of straight tracks 11 to 19. Each of tracks 11 to 19 comprises a plurality of pairs of rails, such as pairs of rails 20, 21.

A plurality of specific item skids are shown in FIGS. 1 and 2 on the network of rails 10. A pipe tail handler skid 30, a dog house skid 31, a riser handling arm skid 32, a rotary table skid 33, a coiled tubing skid 34 and a well intervention coiled tubing injector skid 35.

The network of rails 10 comprises track 11 to 19 in a layout which will be suitable for a rig floor on a drill ship 1. All tracks 11 to 19 may be used to route particular skids between destinations. However, each track 11 to 19 has a main use. The tracks each have a pair of parallel rails spaced approximately 3.2 m.

Tracks 11 and 12 lead around the back of the derricks 4 and 5 and past a downhole tool storage area 22 are used to move particular skids from a bow storage area 23 of the drill ship 1 to the main rig floor 2.

Track 13 is used mainly as a storage area 40 for item skids which may be used in an upcoming operation.

Track 14 is used mainly as an access route to guide skids from the storage area 40 to or close to well-centres 6 and 7. Track 14 also leads to a Christmas Tree elevator 44 located on the port side of the rig floor 2. Christmas Trees (not shown) are located in an area below the rig floor 2 on a Christmas Tree skid (not shown).

Track 15 is used mainly as an access route to guide skids from the bow storage area 23 to or close to the well-centres 6 and 7. Tracks 14 and 15 are also used for locating a dog house skid 31, which provide the driller and tool pusher good views of the well-centres 6 and 7.

Track 16 is used mainly as an access route to guide skids from the storage area 40 and the bow storage area 23 to and over the well centres 6 and 7. Well centres 6 and 7 are located within a pair of rails 24 and 25 which make up Track 16. Such item skids which will be required at well-centre 16 comprise: spider skid 37, diverter skid 38, BOP test stump skid (not shown), a Continuous Circulation System skid (not shown) and a rotary table skid 33.

Track 17 is used mainly as an access route to get specific item skids close to the well-centres 6 and 7, wherein the specific item skids will generally remain on the skids on Track 17 while the item is operated, such as: a pipe tail handler skid 30; an iron roughneck skid (not shown); a casing tong skid (not shown); a crane skid 36.

Track 18 and 19 are used to route the item skids to a skid elevator 41. The skid elevator 41 lifts and lowers item skids between the rig floor 2 and a workshop floor (not shown). Items and item skids to be repaired and maintained will be moved along the tracks 18 and 19 to the skid elevator 41 and lowered to the workshop level which has its own network of rails 43 to move the item skids to an area of the workshop floor 42 suitable for repairing and maintaining that particular item skid.

Cameras 26, 26a, 28, 28a, 29, 34' and 34a are placed in rig structures at a height suitable to obtain a view of the network of rails 10. Camera 28 is arranged between derricks 4 and 5 at a height of preferably five to sixty metres, advantageously, ten to thirty metres above rig floor towards the top of the derrick height.

A spider skid 37 for moving a spider is shown in FIGS. 3 to 5B. The spider skid 37 has: a base 45 for supporting a spider 67; rail engaging shoes 46; a self-propelling propulsion system 50; a parking system 55; automatic hook-up system 60 for power and communication; and automatic on-board control system 70.

Each of the skids 30 to 38 and any other skid disclosed herein preferably has a base for supporting an item; rail engaging shoes; a self-propelling propulsion system; a parking system; automatic hook-up system for power and communication; an electronic data gathering system; and automatic control system.

In use, the spider skid 37 is provided with a flow of hydraulic fluid to the propulsion system 50 controlled by the on-board control system 70 to propel the skid. The propulsion system 50 can operate in a pull or push mode and in a first direction or a perpendicular second direction. The propulsion system 50 has a rail gripping foot 51 and a cycling leg 52. The on-board control system controls a flow of hydraulic fluid to selectively actuate the rail gripping foot 51 and the cycling leg 52 to push or pull the skid along the rail. The spider skid 37 can travel at a speed of between 0.3 and 3 m/min or faster.

Figure 5:
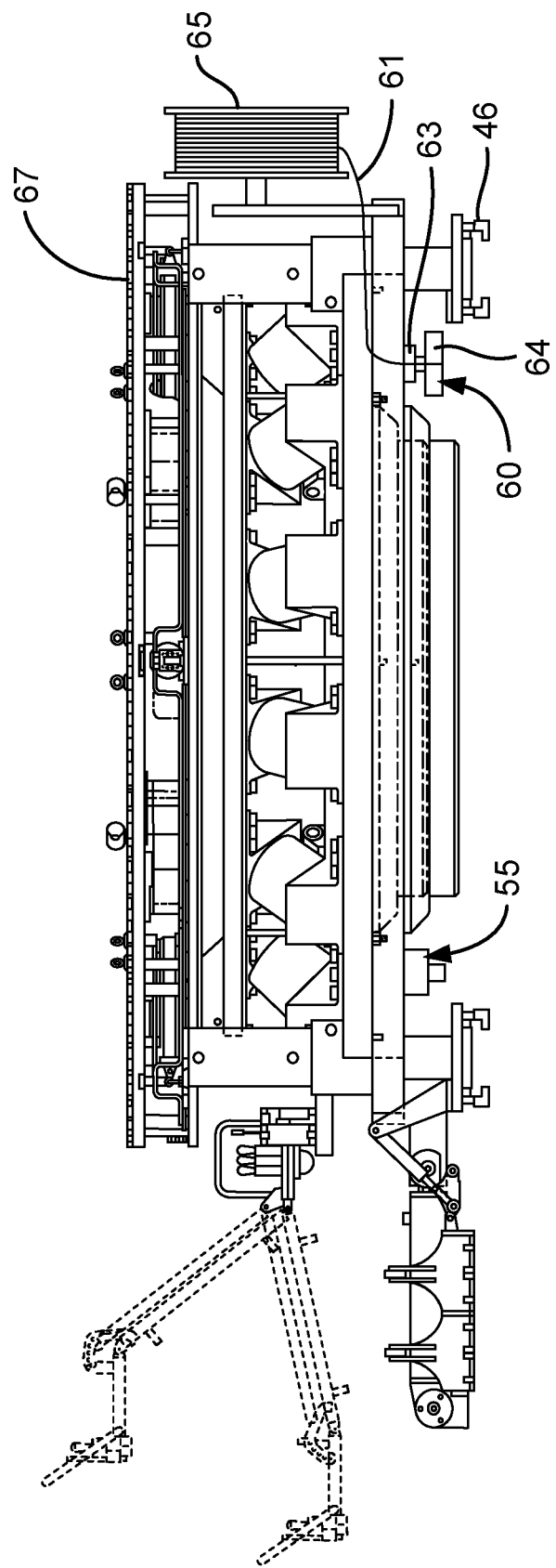
FIG. 5 is a side view of the spider skid shown in FIG. 3 with a spider thereon.
Figure 5A:
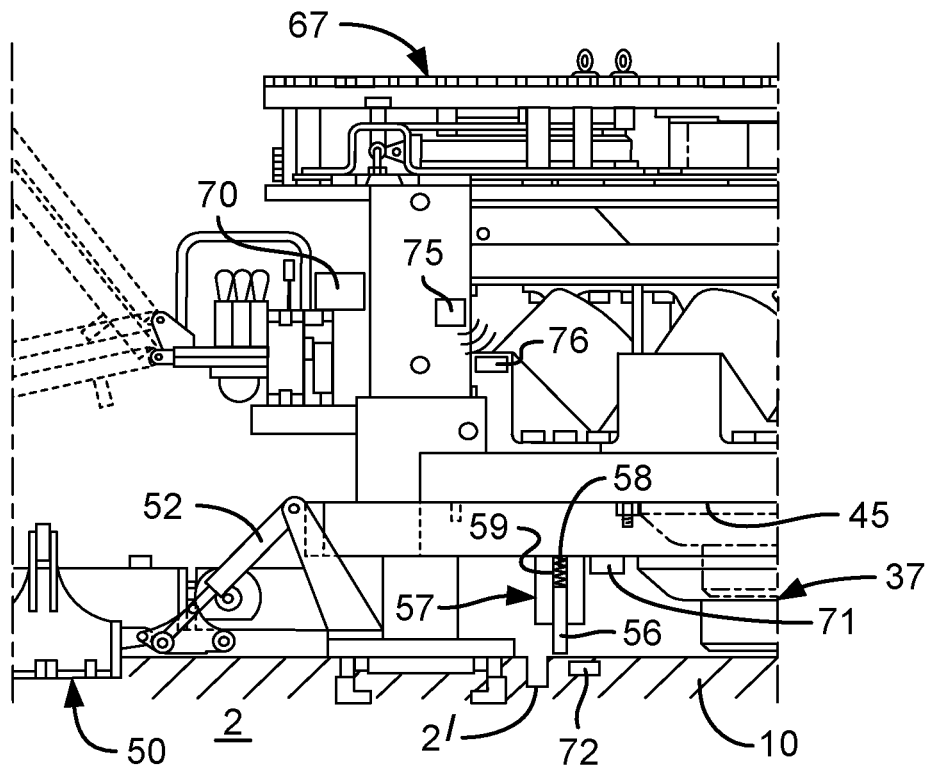
FIG. 5A is a side schematic view of part of the spider skid shown in FIG. 5, approaching a parking spot on a rig floor of the drill ship shown in FIG. 1.
Figure 5B:
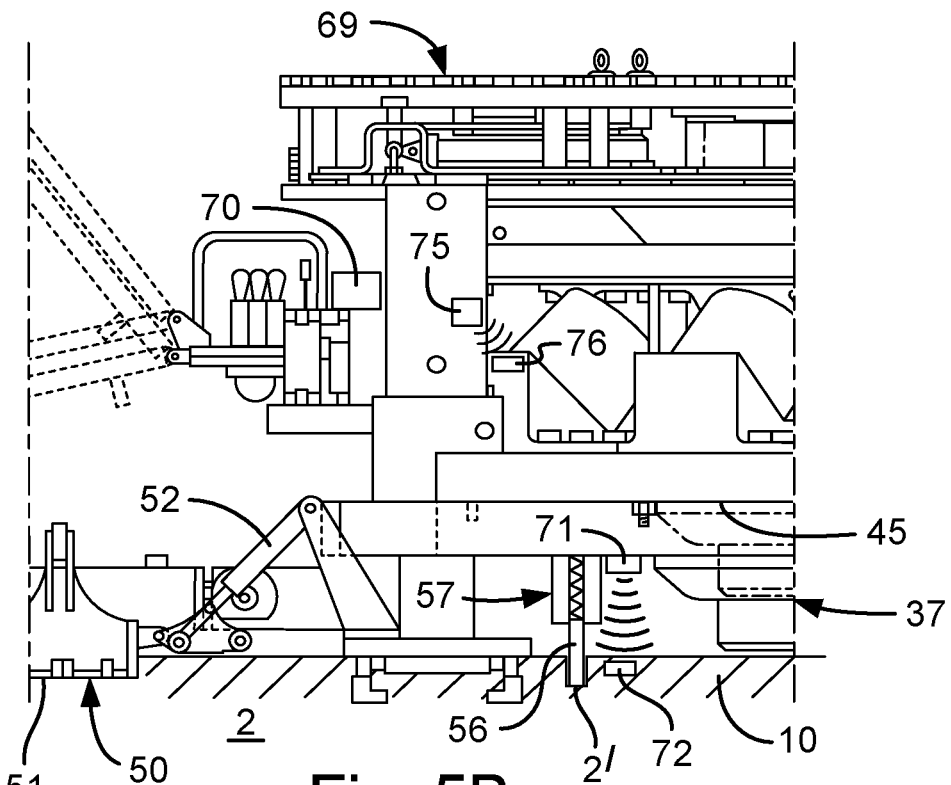
FIG. 5B is a side schematic view of part of the spider skid shown in FIG. 5, at a parking spot on a rig floor of the drill ship shown in FIG. 1.
Figure 5C:
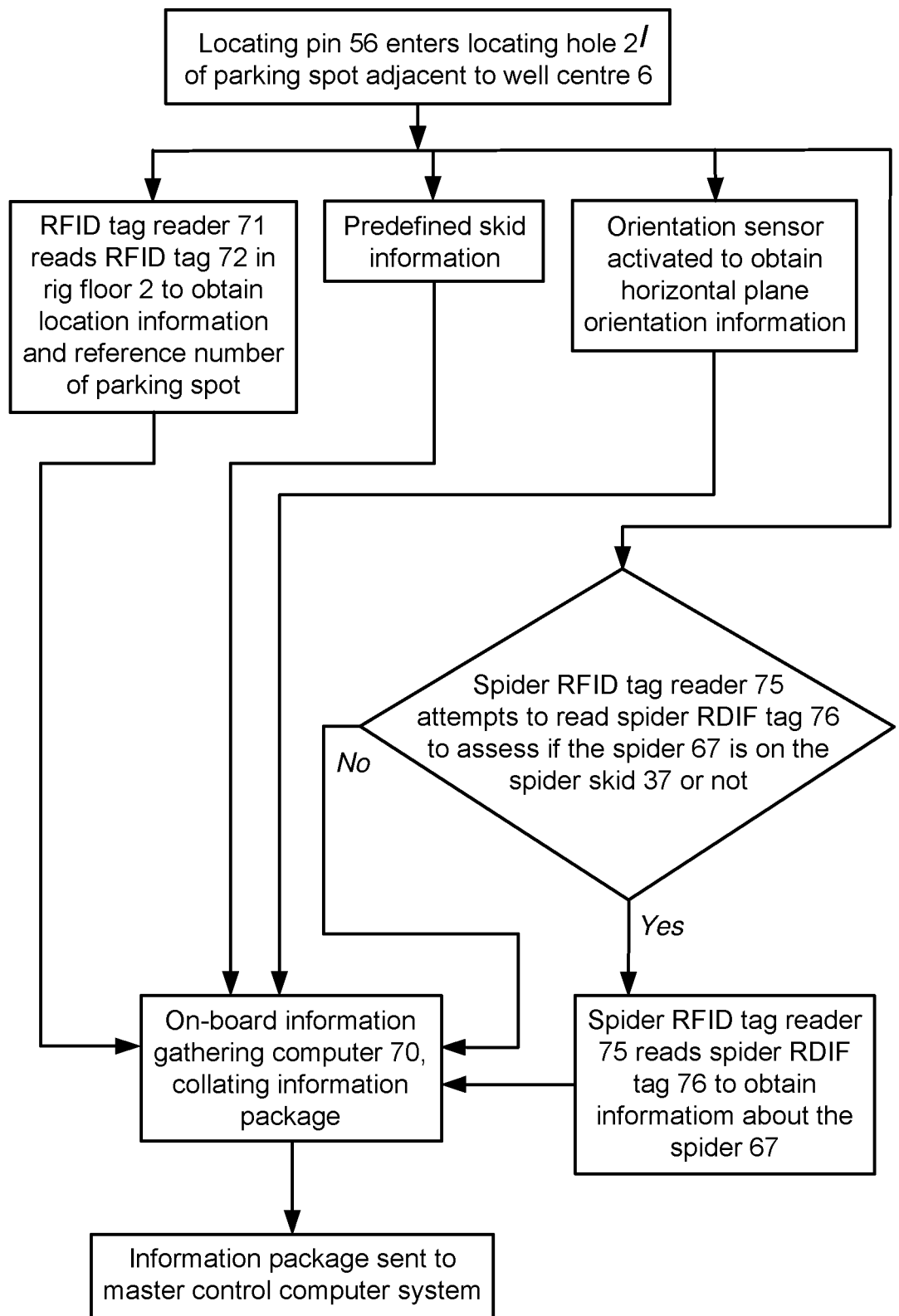
FIG. 5C is a flow diagram showing data flowing into an on-board data gathering computer and collating an information package.

The spider skid 37 has a parking system 55. When the spider skid 37 is close to a predetermined parking spot, a locating pin 56 of a locating pin mechanism 57 on an underside of the square base plate 66 is activated by master control system 100, which lowers the locating pin 56 on a pin ram 58, as shown in FIGS. 5A and 5B. The locating pin 56 is now resiliently biased downwardly against the rig floor 2 by a resilient means, such as a spring 59. The spider skid 37 continues under its self-propulsion until the locating pin 56 passes over a locating hole 2' at which point the spring 59 biases the locating pin 56 into the locating hole 2'. The control system 70 ceases the flow of hydraulic fluid to the propulsion system 55, which stops the spider skid 37 from further movement. The rail gripping foot 51 is actuated to grip the rail 10 to act as a hand brake. Alternatively or additionally, the parking system 50 may also act as a hand brake to inhibit the spider skid 37 from moving.

The master control computer system may be located on the drilling ship 1 and preferably on a dog house skid 31. Alternatively or additionally, the master control computer system 100 is located in a control room (not shown) at a distance from the drilling ship 1, such as on land.

The automatic hook-up system 60 has a combined hydraulic fluid supply hose and communication lines 61 provided between the rig floor 2 and the spider skid 37. Combined hydraulic hook-up and communication line hook-up points 62 (only four of many are shown in FIG. 2) are provided in the rig floor 2 between the rails and approximately 2.8 metres behind each locating hole 2'. Combined hydraulic hook-up and communication line hook-up points 62 is connected to a pressurised hydraulic fluid supply (not shown). A pressurised hydraulic supply is a common feature of all drilling rigs and drill ships. A hook-up connector mechanism 60 has connector block 64 comprising a hydraulic connector and a communication line connector which is arranged beneath a small self-powered ram 63 to plug the connector block 64 into the combined hydraulic hook-up and communication line hook-up points 62 The combined hydraulic fluid supply hose and communication lines 61 are fixedly connected to a top of the connector block 64 and wound around a self-powered reel 65 which has a rewind mechanism (not shown).

Before the spider 67 is needed, a command is sent to operatives in the workshop to prepare the spider skid 37. The spider 67 is placed on the spider skid 37 in the workshop and travels up on the skid elevator 41, along tracks 13 and parked in the buffer storage area 40.

Referring to FIGS. 5A and 5B, an information package is collated by the on-board information gathering computer 70. A parking RFID tag reader 71 arranged on the underside of base plate 45 adjacent the parking mechanism 55. The RFID tag reader 71 is activated by the on-board information gathering computer 70 to read parking spot information from RFID tag 72 in the rig floor 2. The RFID tag 72 reader sends a parking spot information package, such as location and a reference number to the on-board information gathering computer 70. A spider RFID tag reader 75 is activated by the on-board information gathering computer 70 to read spider information from RFID tag 76. If there is no RFID tag 76 to read, then an on-board information package is sent to the on-board information gathering computer 70 indicating that no spider 67 is aboard the spider skid 37. A further weight sensor arranged on the base plate 45 and linked to the on-board information gathering computer 70 may be used to check this is the case. If the RFID tag reader 70 is able to read the RFID tag 76, the information relating to the spider 67 is sent to the on-board information gathering computer 70 as a spider information package. Such spider information package may include data about the external dimensions, type of pipe it is suitable for use with, size, and any faults it may have or have had and subsequent rectifications. An orientation information package such as orientation of the skid may also be obtained by the on-board information gathering computer 70 from an orientation sensor (not shown). A storage memory, such as RAM or EPROM (not shown) is also arranged on the spider skid 37 containing a spider skid information package, which contains information such as a reference number and a description stating that it is a spider skid. The spider skid information package, orientation information package, spider information package, on-board information package, and parking spot information are collated into a skid information package by the on-board information gathering computer 70 and sent to the master control computer system 100.

The master control system 100 is provided with a pre-programmed arrangement for setting a spider at well centre. The master control system 100 also has skid information packages from every skid on the network of rails 10.

Referring to FIGS. 1 and 2, the camera 26a captures a top plan view parking image of the crane skid 36 and any other item skid in the parking area 40. The parking image is sent to the master computer control system 100. A parking sub-image of the crane skid 36 is identified and analysed. The parking sub-image contains a top plan view of the crane skid 36. A reference crane skid plan viewing a stowed position, such as the view shown in FIG. 6A, is stored on the master computer control system 100. The top plan view of the crane skid of the parking sub image is compared to the reference crane skid plan view. If the top plan view of the crane skid of the parking sub-image is significantly different to the reference crane skid plan view, the master computer control system 100 sends a signal to the crane skid 37 disallowing movement along the network of rails 10. A further signal is sent to an operative in accordance with a health check system, as set out below. If the top plan view of the crane skid of the parking sub-image is substantially the same as the reference crane skid plan view, the master computer control system 100 sends a signal to the crane skid 37 allowing movement along the network of rails 10 to its destination at parking spot on track 17. Thus the above described steps check the health of the crane skid to enable travel along the network of rails 10.

In order to assess if the top plan view of the crane skid 37 of the parking sub-image is substantially the same as or significantly different from the reference crane skid plan view, the master computer control system 100 analyses certain features: a colour contrast about an outline of the skid against the rig floor; a colour contrast about features on the base plate of the skid and the item thereon; depth measurement using a range imaging camera to identify a feature such as a jib to assess if the jib is up or down, by measuring the difference between a depth measurement to the skid base or rig floor and a depth to the end of the jib, taken from a camera high up in a rig structure above the crane skid. The depth measurement for the jib 81 in the lowered and raised positions are preprogrammed into a memory storage area of the master computer control system 100.

Preferably, the skids are of a contrasting colour to the rig floor. Advantageously, the rig floor 2 is of a predetermined colour and is consistent thereacross.

Figure 7:
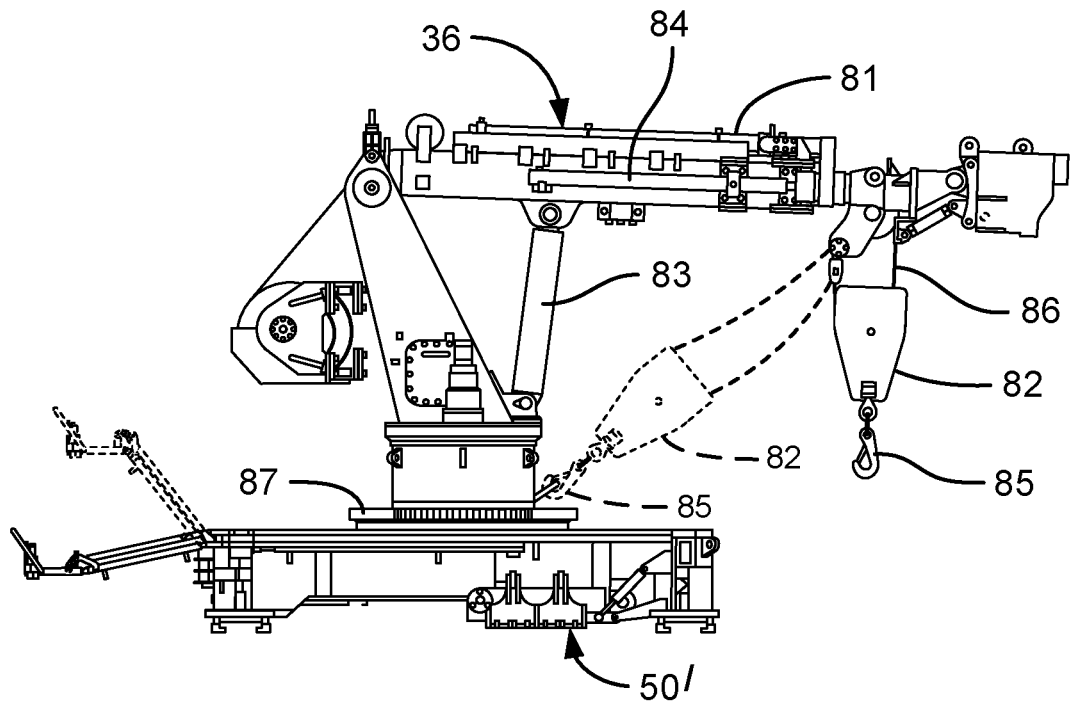
FIG. 7 is a side view of the crane skid shown in FIG. 6 in a stowed position for transportation along the network of rails shown in FIG. 1.
Figure 8:
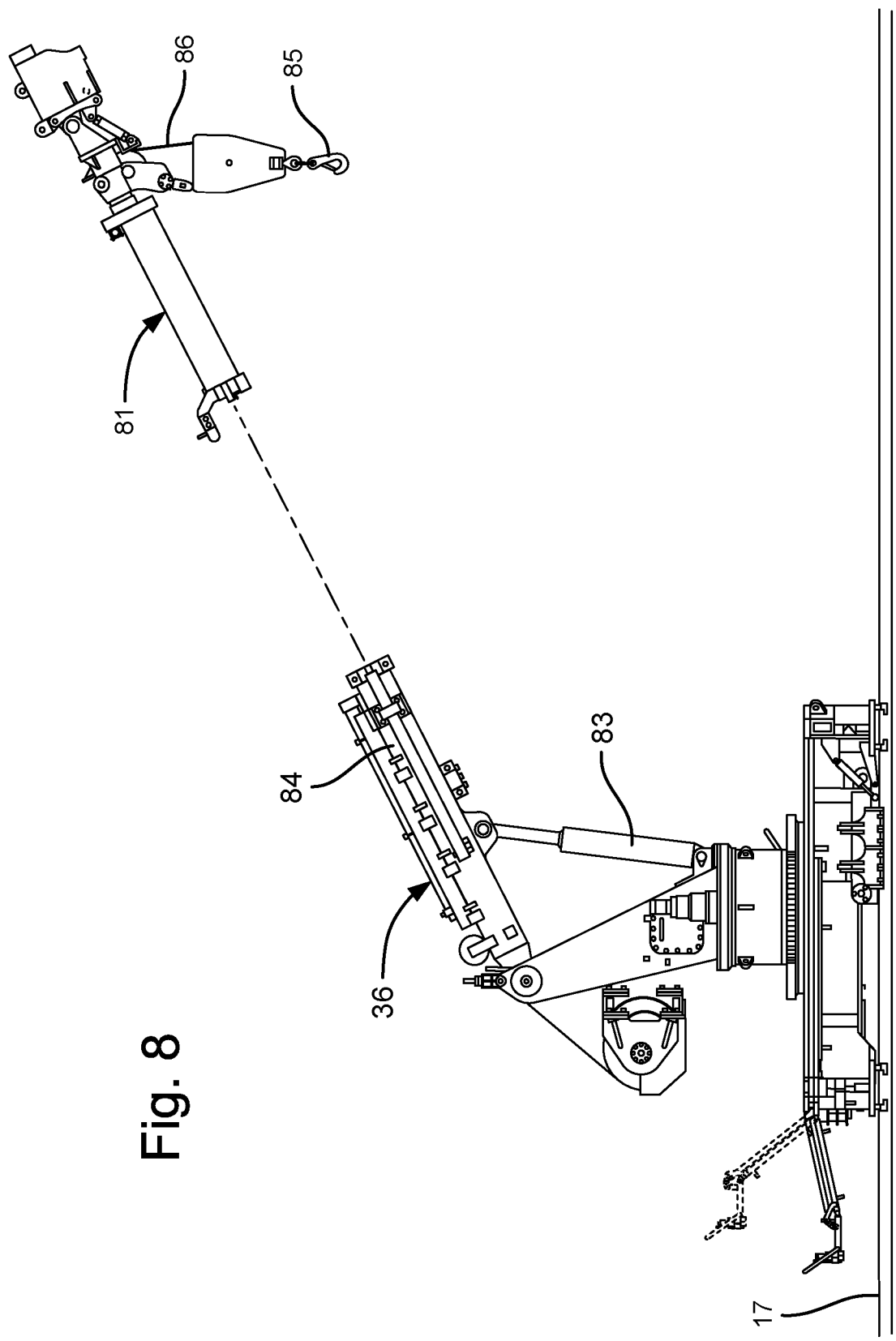
FIG. 8 is a side view of the crane skid shown in FIG. 6 with a jib in an extended position in use whilst on the track of network of rails.

The master control system 100 automatically sends the spider skid 37 to its destination when required. For instance, the driller presses an "install drill pipe spider in first well centre" button on a visual touch screen interface 100' of the master control system 100 from the dog house skid 31. The destination will be on track 16 at one of the well-centres 6 or 7, in this case well-centre 6. The master control computer system 100 controls the spider skid 37 to withdraw locating pin 56 from locating hole 2' and then activate the on-board control system 70 to control the propulsion system 50, so that the spider skid 37 can move to its destination. From the storage area 40, the spider skid 37 propels itself to track 16 to a predetermined parking spot 16' next to well centre 6. Simultaneously, the crane skid 36 (shown in FIGS. 6 to 8) is sent from buffer storage area 40 to a predetermined parking spot 17' on track 17 close to well centre 6. The crane skid 36 has the same self-propelling system, parking system, automatic hook-up system and automatic control system as described with reference to the spider skid 37. It should be noted that the reel of the automatic hook-up system is not shown in FIGS. 6 to 8 for clarity. The crane skid 36 has a crane 80 with a jib 81 in a retracted position and a travelling block 82 in a retracted and stowed position for transport along the network of rails 10. The crane skid 36 is parked on track 17 at the predetermined parking spot 17' using a parking mechanism (not shown), which is identical to the parking mechanism 55 shown and described with reference to the spider skid 37. The crane 80 on crane skid 36 is then operated from a remote location, such as from the dog house skid 31, using fly-by-wire control system (not shown) to activate hydraulic valves in the crane 80, or can be operated in automatic mode by the master control computer system 100. The computer system 100 knows the absolute location of the crane skid 36 and the spider skid 37 from the crane information package sent from the crane skid's on-board control system. In automatic mode, the jib 81 is raised using ram 83 and extended using ram 84 over the spider 67 in the spider skid 37. A hook 85 is lowered on line 86 over the spider 67 and under a hook receiver of the spider (not shown). The hook 85 is raised on line 86, lifting spider 67. The crane 80 is rotated on rotating table 87 and lowered into well-centre 6. The crane 80 thus has an unsafe zone 99 about the crane skid 36 in which it is not safe for rig hands to be during use. This unsafe zone 99 may be the expected area of use defined by an angle defined by the jib 81 over the spider 67 traversing to the well-centre plus an additional angle in which the jib is likely to move during this operation and the expected length of extension of the jib 81, as well as topple zone in case outriggers are not activated properly or if the item to be lifted is too heavy for the crane. An unsafe zone further includes an angle in a vertical plane defined by the rig floor 2 and the jib 81 when lifted on ram 83 to an expected working angle. Thus the unsafe zone may be two dimensional and preferably three dimensional.

Alternatively, the unsafe zone may be defined by the entire 360 degrees on movement in which the crane 80 can traverse in top plan view, maximum length of the jib 81 when fully extended and an angle formed by the jib and the rig floor when ram 83 is fully extended and a further safety margin for hook swing on line 86. However, this may be an unnecessarily large unsafe zone.

Figure 6:
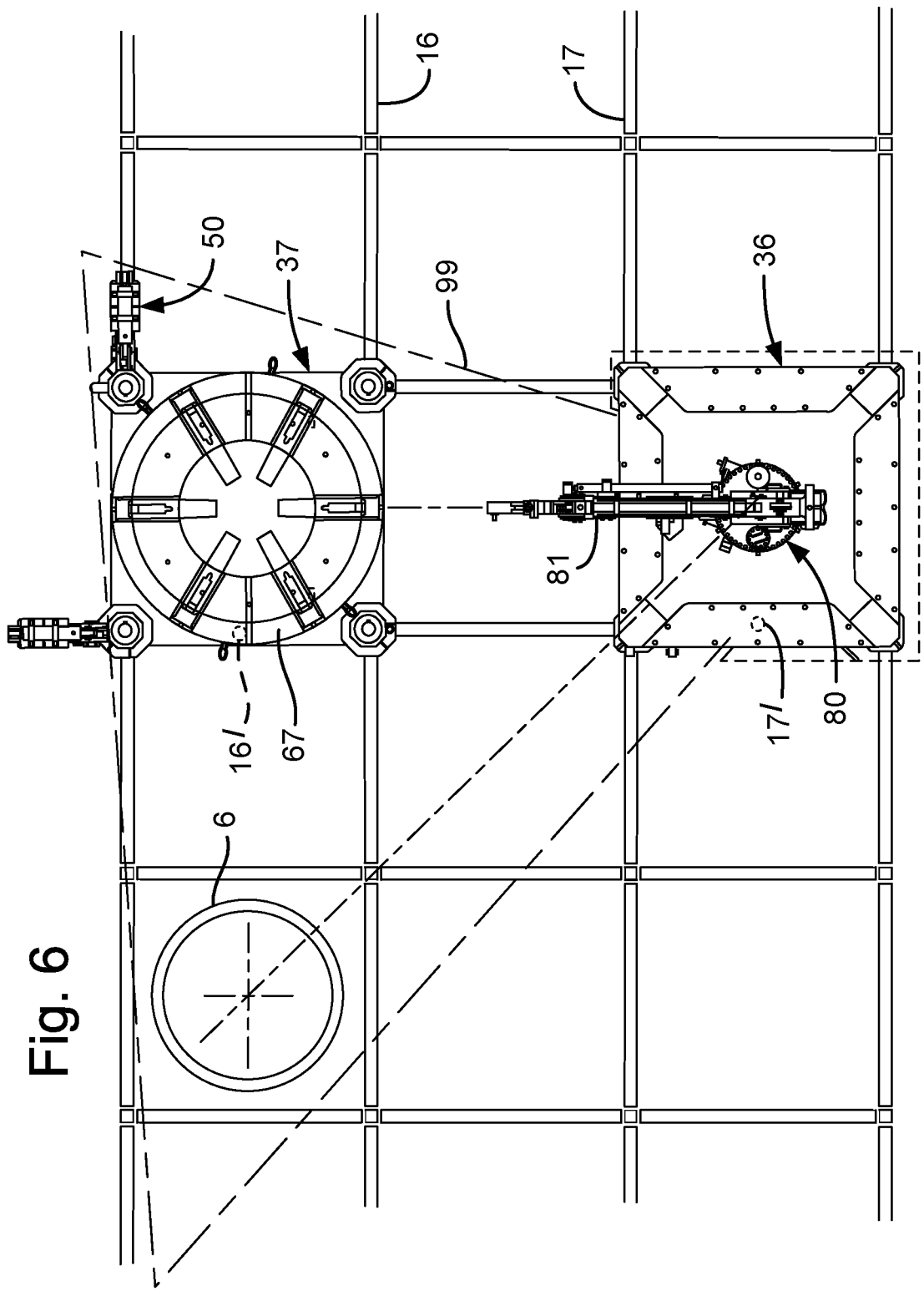
FIG. 6 is a top view of the spider skid as shown in FIG. 4 and a crane skid on adjacent tracks of the network of rails as shown in FIG. 1 at well-centre.
Figure 6A:
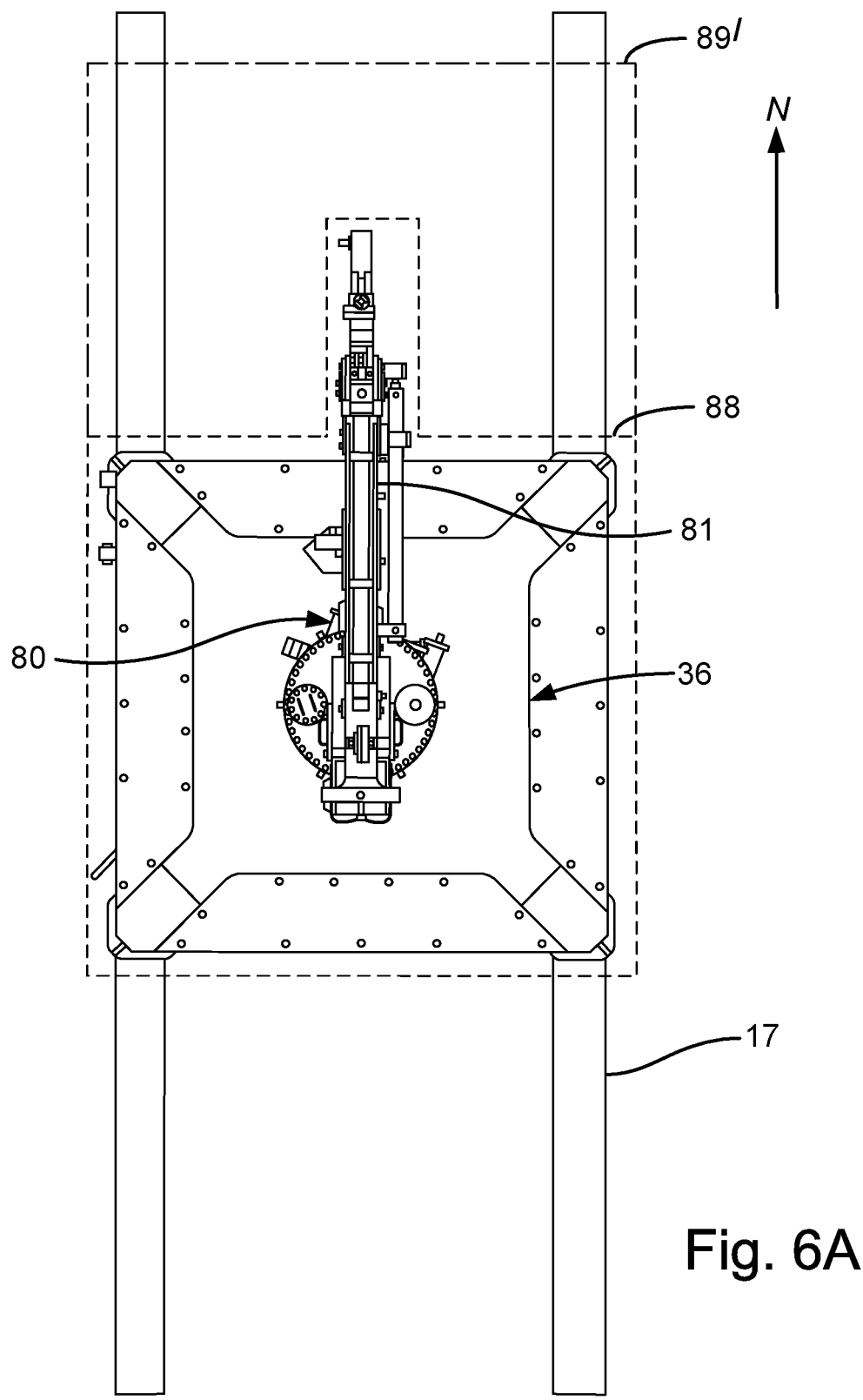
FIG. 6A is a top plan view of the crane skid shown in FIG. 6 on a track with a stationary unsafe zone marked in dashed and an additional unsafe zone marked in dash dot line.

The crane skid 36 has an expected stowed plan view as shown in FIG. 6 for transportation along network of rails 10 having an unsafe zone 88 marked in dashed lines.

The crane skid 36 also has an expected unsafe zone 89' when moving along track 17, shown as a northerly direction. The additional area is an area located in the direction of travel of the crane skid 36 and is of sufficient length from the crane skid 36 to allow the skid to be stopped from the maximum speed of the skid as well as time for the obstruction to be observed and acted on.

During the spider skid's journey from the storage area 40 to the parking spot 16' on track 16 the skids on the network of rails 10 are monitored using the cameras 26 and 28. The cameras 26 and 28 capture a series of master images in real time, preferably at a frame rate of once per second and each master image is sent to the master computer control system 100 for analysis. The master images are used in four ways: to continuously monitor the health of the skid; to mitigate collisions; to mitigate accidents between skids and rig hands; and to mitigate accidents between tools and rig hands.

Figure 23:
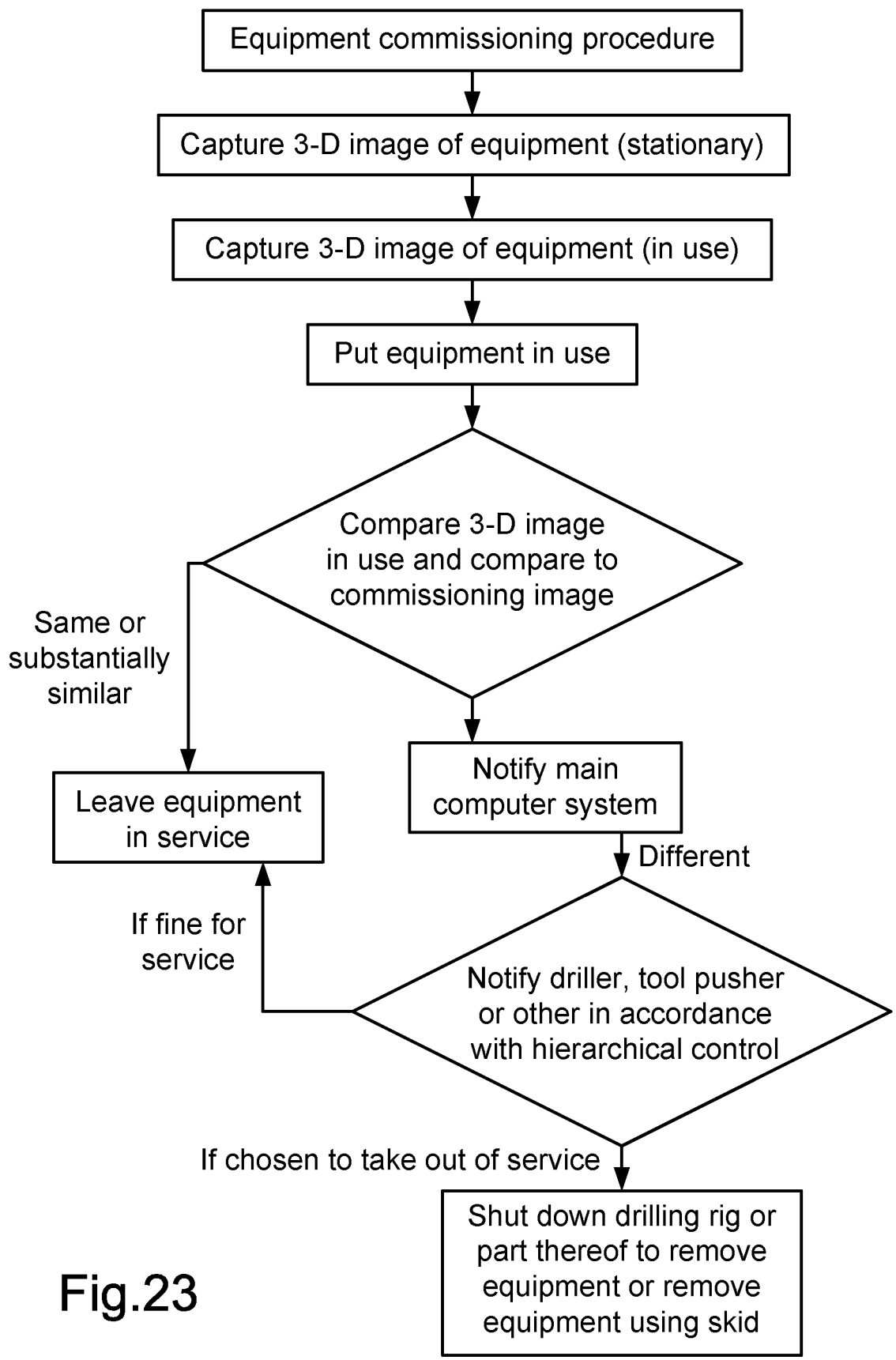
FIG. 23 is a flow diagram showing steps in a method of checking the health of a piece of equipment on a drilling rig.

The continuous monitoring of the health of the skid is carried out in the same way as the health of the skid was assessed in the storage area, and as shown in and described herein with reference to FIG. 23.

Figure 9:
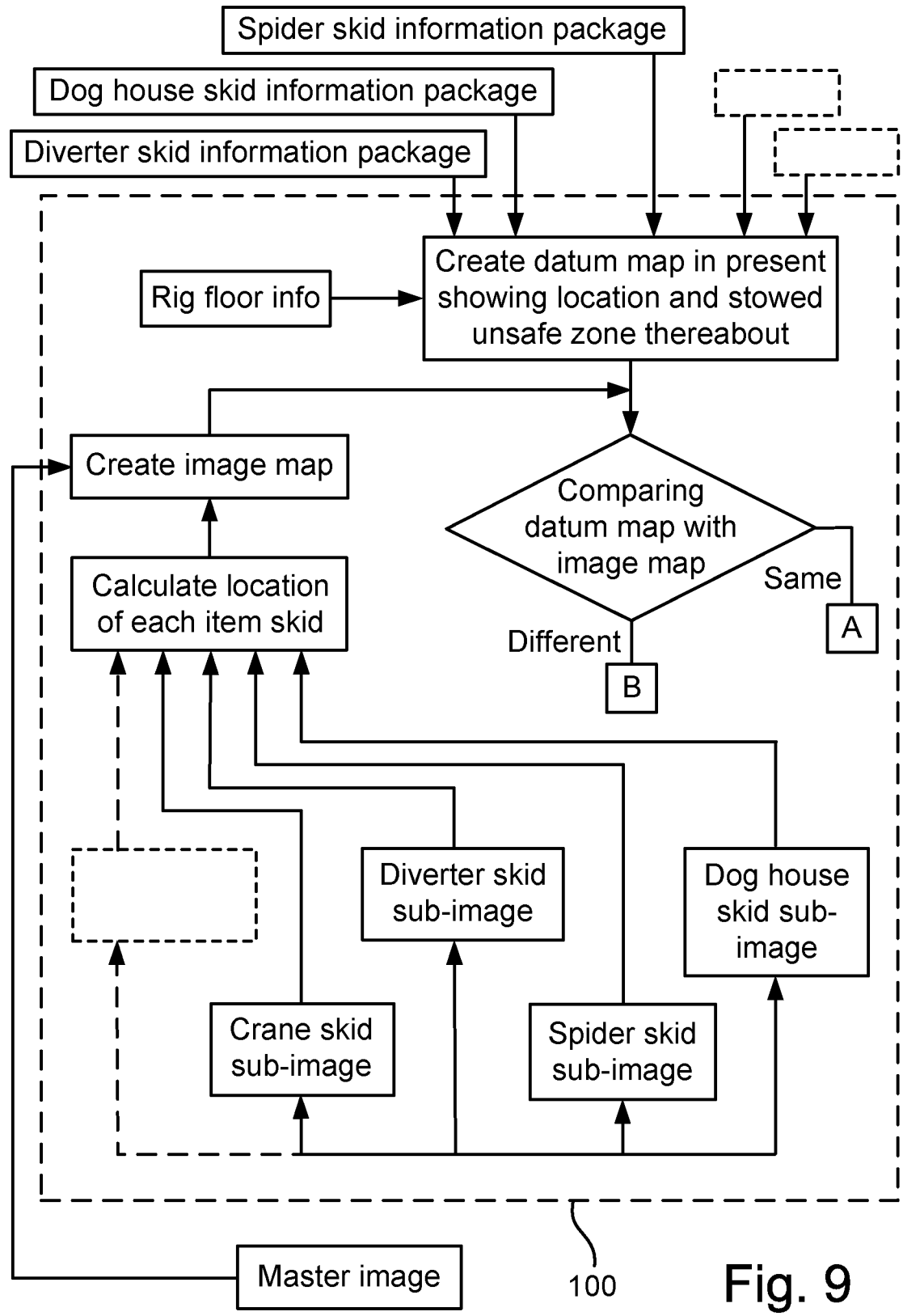
FIG. 9 is a flow diagram showing data flow for a collision mitigation system.
Figure 10:
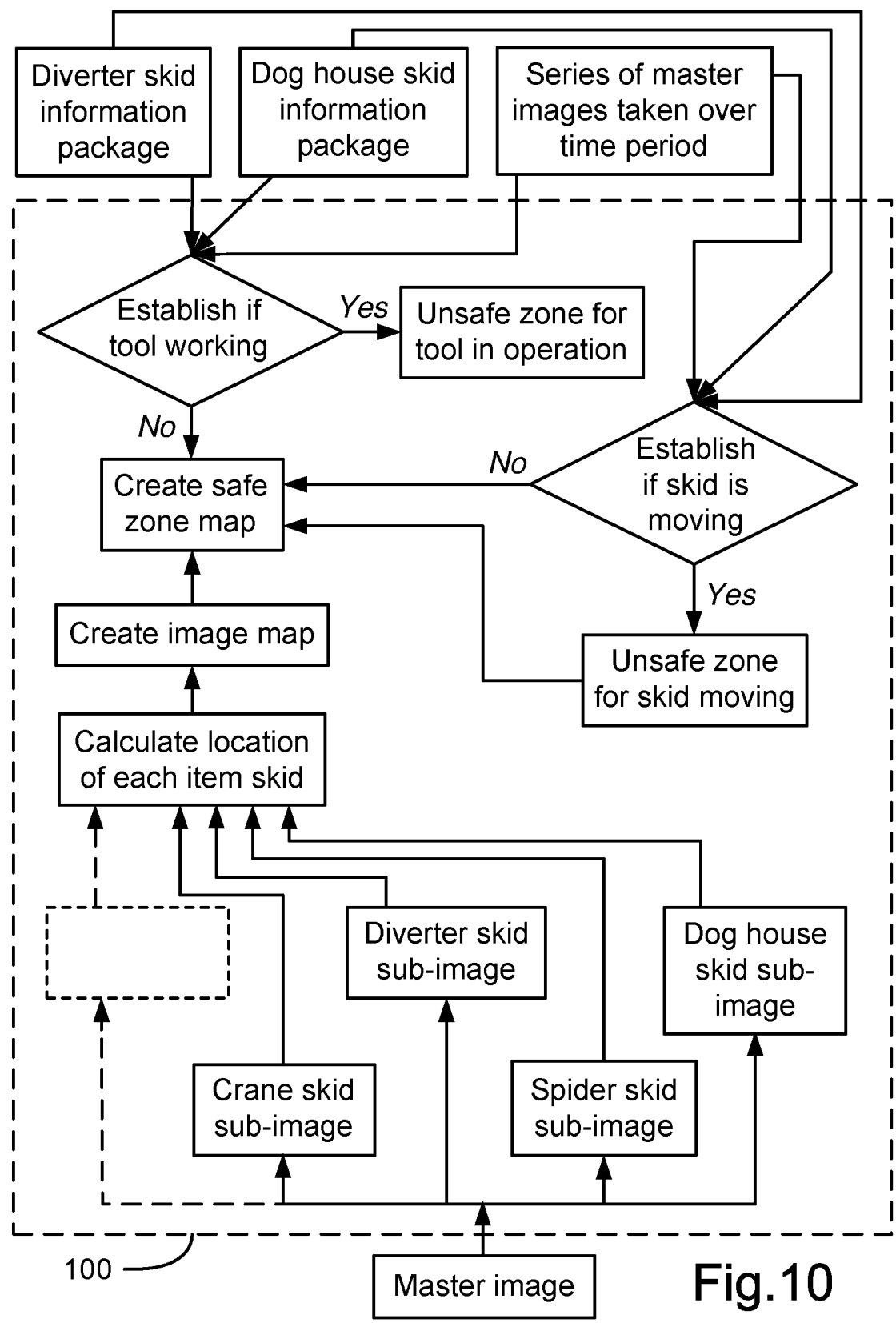
FIG. 10 is a flow diagram showing data flow for a further collision mitigation system.

The mitigation of collisions is carried out using the master computer control system 100 using steps shown in FIGS. 9 and 10. Referring to FIG. 9, the master computer control system 100 already has information from the skids 30 to 38 in the form of item skid information data packages which are continuously updated, preferably at a rate of at least one update per minute and preferably one to fifty updates per second. The master computer control system 100 controls the item skids 30 to 38 by issuing commands to each item skid according to predetermined and preprogrammed set of sequences to complete a particular task, such as an "install drill pipe spider in first well centre" task as set out above with reference to FIG. 6. If the preprogrammed set of sequences is followed, a collision should not occur. A datum location for each item skid 30 to 38 for those which are travelling along the tracks is estimated by knowing the departure time from a parking spot, the route and the speed at which the item skid is travelling e.g. 1 metre per minute. Location and orientation information for each item skid is compiled as datum location and orientation information and/or mapped by the master computer control system 100 to create a datum map. The items on the item skids 30 to 38 are in a stowed position and a stowed unsafe zone is predefined for each item skid.

The series of master images captured in real time are used to check that the skids 30 to 38 are all in their correct parking spots or travelling on their correct routes at an expected point therealong as identified by the skid information data packets and the preprogrammed set of sequences. The master control computer system 100 creates sub-images for each skid 30 to 38 to identify each skid. Once a sub-image has been created, the item skid is identified using the technique described with respect to the hierarchical structure as set out above, using colour contrast data about an outline of the item skid and/or item on the skid and/or range data for mapping the entire shape of the item skid and comparing results with a preloaded reference list of item skids.

Once each item skid has been identified, it is located using range information from the camera in combination with directional information and compared to the datum location and orientation information and preprogrammed set of sequences. Alternatively or additionally the master image is compared to the datum map to assess if the item skids are out of place.

If the item skids 30 to 38 are all in the anticipated positions, sequence "A" is carried out by the master computer control system 100, which simply allows the task to continue.

If one or more of the item skids 30 to 38 is out of place compared to the datum location and orientation and preprogrammed set of sequences, a sequence "B" is followed which comprises an alert sent to the driller or tool pusher in the dog house 31 and/or an operative according to a set of health check and hierarchical rules as set out below with reference to FIG. 25.

Furthermore, sequence "B" also includes the master control computer system 100 identifying any other item skid within the predefined short stowed unsafe zone, from with the one or more item skids 30 to 38 identified as being in a different place, and if collision is likely with the one or more item skids 30 to 38 in a different place to send a command to the other item skid to stop or take a different predetermined route.

Furthermore, as sown in FIG. 10, a collision mitigation system also comprises the master control computer system 100 identifying the stowed unsafe zone for each of the item skids 30 to 38. The skid information package includes an item information package which has information about the type of item skid, such as crane skid and if the item is in use. If the item, such as a crane is in use, an in-use unsafe zone is defined. This is defined in default as the maximum range of movement of the jib plus a further safety margin. However, the in-use unsafe zone is defined to a reduced size with information from a particular task, such as the task described with reference to FIG. 6, wherein the zone is reduced to approximately eight metres from the centre of the crane skid in a seventy-five degree zone in a horizontal plane and seventy-five degrees in a vertical plane and a small area about the base of the crane skid 36.

Figure 11:
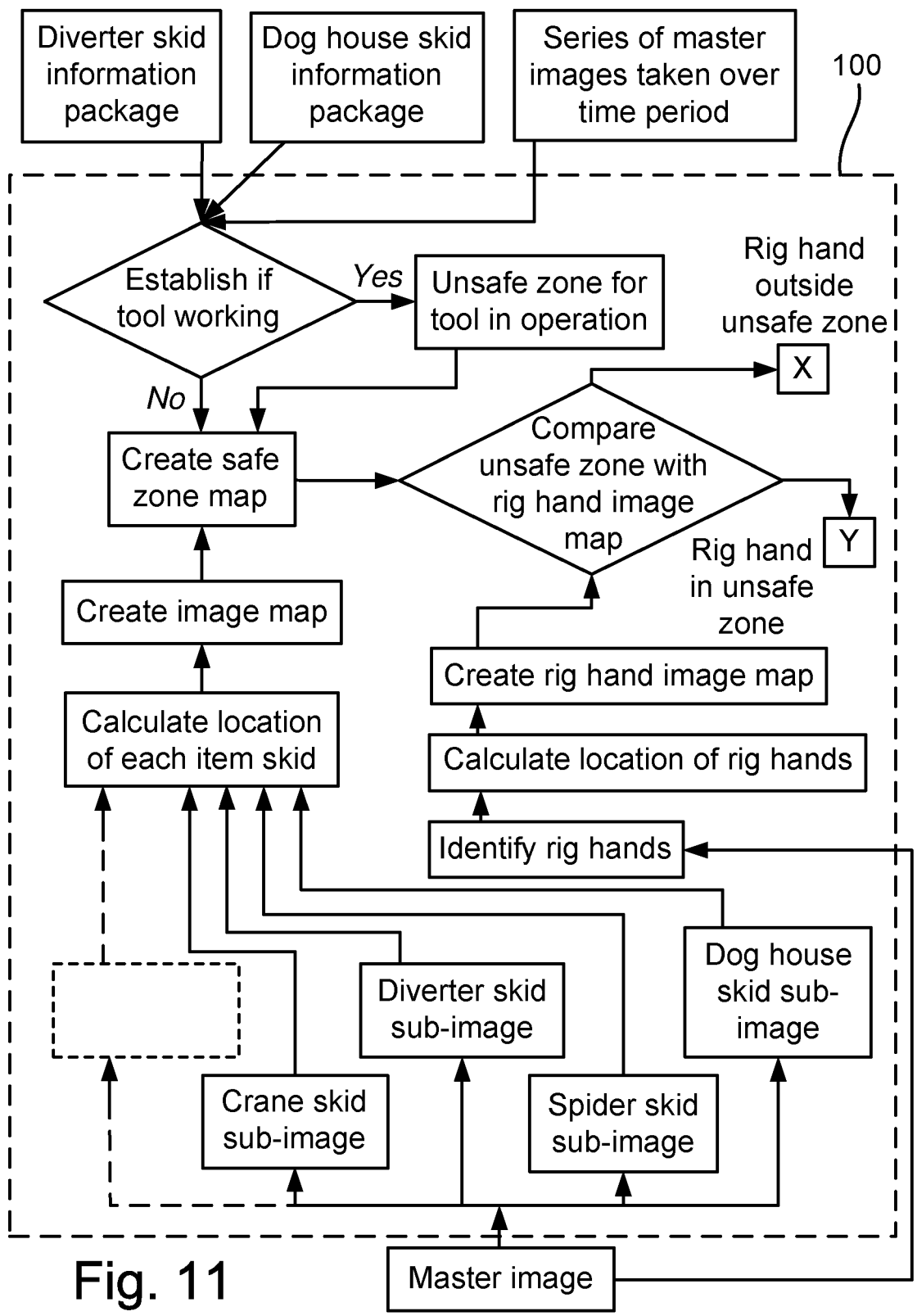
FIG. 11 is a flow diagram showing data flow for a system for mitigating accidents between rig hands and tools carried on or forming part of skids.

A system for mitigating accidents between item skids or tools and rig hands is also provided. With reference to FIG. 11, the series of master images from cameras 26 and 28 are analysed by the master control computer system 100 to identify if any rig hands appear in the master image and then identifies the location of the rig hand on the rig floor 2. The master control computer system 100 has a set of preprogrammed unsafe zones in which rig hands are not allowed, and a set of default unsafe zones for each item skid 30 to 38, and an in use unsafe zone for each item skid when used in a predefined task, such as a the in-use unsafe zone described above with reference to the crane skid 36 during a spider installation operation, or in front of an item skid travelling along a track of the network of rail 10. If the rig hand is within the in-use unsafe zone, the master control computer system 100 sends a command to the item skid to cease operation. In this case, if the rig hand is within the in-use unsafe zone of the crane skid 36, the master control computer system 100 sends a command to the crane skid 36 to cease operation.

The dog house skid 31 shown in FIG. 1 comprises a cabin 90, arranged on a skid 90' incorporating the same self-propelling system, parking system, automatic hook-up system and automatic control system as herein described with reference to spider skid 37. A rotating base such as a turntable, is arranged between the skid 90' and the cabin 90 to allow the cabin 90 to rotate relative to the skid 90' to facilitate the driller and tool pusher to obtain the best view of the well centres 6 and 7. A parking spot and route is preprogrammed into a memory of the master control computer system 100 for each of the preprogrammed layouts for drilling casing, riser installation, intervention etc. In this case, a stowed unsafe zone is preprogrammed in the item skid information package or the master control computer system 100, which defines a circle in which the dog house can rotate thereabout. An in-use unsafe zone is preprogrammed into a memory of the master control computer system 100 for each layout.

Figure 13:
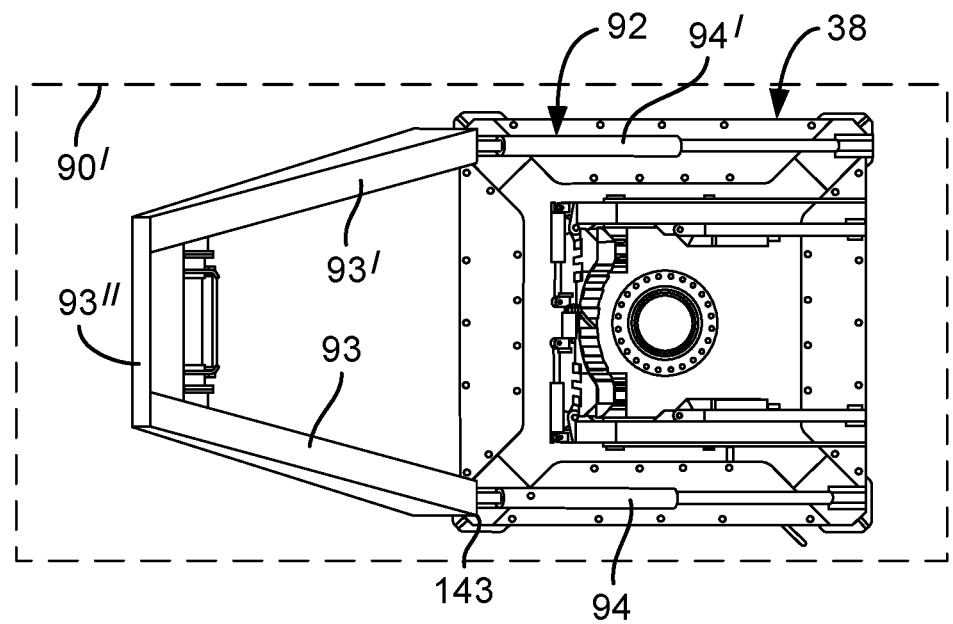
FIG. 13 is a top view of the diverted skid shown in FIG. 12.
Figure 12:
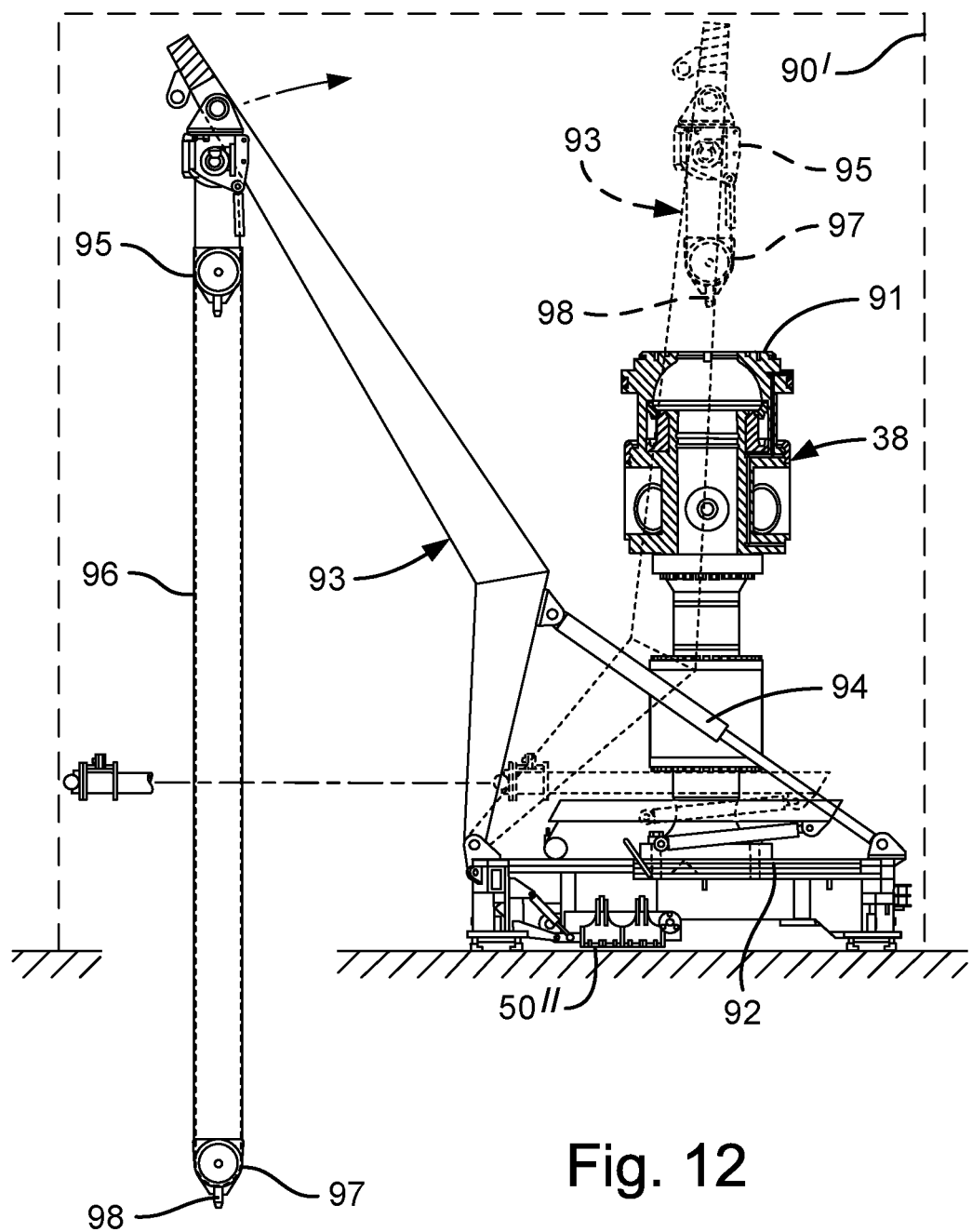
FIG. 12 is a side view of a diverter skid for use on the network of rails shown in FIG. 1 the diverter skid having a diverter thereon and a lifting apparatus for lifting the diverter on to and from the diverter skid.

A diverter skid 38 is shown in FIGS. 12 and 13 having a diverter 91 thereon. The diverter skid 38 is provided with the same self-propelling system, parking system, automatic hook-up system and automatic control system described with reference to the spider skid 37. The diverter skid 38 is thus generally similar to the spider skid 37, save for the following differences. The diverter skid has a generally planar base plate 92 and a lifting arm mechanism 93. A ram 94 and 94' is pivotally arranged on opposing sides of the base plate 92 and elbows of rigid kinked arms 93 and 93'. A powered crown block 95 is hung from a top bar 93" linking tops of the rigid kinked arms 94 and 94'. A wireline 96 runs between the powered crown block 95 and a small travelling block 97 having a connector 98. In this case, a stowed unsafe zone is simply an area defined by the base 92 of the diverted skid 38 plus a small margin.

In use, the master control system 100 automatically sends the diverter skid 38 to its destination when required. For instance, the driller can press an "install diverter in first well centre" button at a visual interface (not shown) of the master control system from the dog house skid 31. The destination will be on track 16 at one of the well-centres 6 or 7. The master control computer system 100 controls the diverter skid 38 to activate the parking system to withdraw a locating pin from locating hole 2' and then activate the on-board control system to control the propulsion system, so that the diverter skid 38 can move to its destination. From the storage area 40, the diverter skid 38 propels itself to track 16 to a predetermined parking spot next to well centre. The lifting arm mechanism 93 is initially arranged in a first position identified in ghost lines in FIG. 14, with rams 94 and 94' in a substantially upright position and with the connector 98 connected to a lifting point (not shown) on the diverter 91. The master control computer system 100: activates the powered crown block 95 to lift the diverter 91 clear of the base 131; extends hydraulic rams 94 and 94' to shift the diverter over well centre 6; to activate the powered crown block 144 to lower the diverter 91 on to well centre. Alternatively, the lifting arm mechanism 93 is operated from a remote location, such as from the dog house skid 31, using fly-by-wire control system (not shown) to activate hydraulic valves (not shown) in the lifting arm mechanism 93. Hydraulic power and communication lines for the lifting arm mechanism 94 and 94' is provided through an auxiliary line (not shown) on the diverter skid 38, which branches from the combined hydraulic fluid supply hose and communication lines 61. Thus an additional hook-up is not required. An in-use unsafe zone 90' is predefined for the task and shown with dashed lines in FIGS. 12 and 13.

Bare skids may be provided with a simple square planar base plate to move other items around the rig floor 2. Two or more bare skids can operate in unison one behind the other in order to move long or large items. A stowed unsafe zone is programmed in manually for each item or chosen from a predefined list preprogrammed into the master control computer system 100. Alternatively or additionally, a safety image of the item on the bare skids is obtained. The safety image is processed by the master control computer system 100 and an algorithm used to estimate an area about the bare skids for a safety zone.

The pipe tail handler skid 30 shown in FIGS. 1 and 2, is provided with the same self-propelling system, parking system, automatic hook-up system and automatic control system described with reference to the spider skid 37, although may have the manual hook-up system described with reference to the BOP test stump skid 39. The pipe tail handler skid 30 is thus generally similar to the spider skid 37, save for the following differences. The base 167 is substantially planar with a vertical rigid column 168 on which is mounted an articulated pipe handler arm 166 having a pipe gripper 169. The pipe handler arm 166 and pipe gripper 169 are hydraulically actuated and controlled from the master control computer system 100. Hydraulic power and communication lines for the pipe handling arm 166 is provided through an auxiliary line (not shown) on the pipe tail handler skid 30, which branches from the combined hydraulic fluid supply hose and communication lines 100. Thus an additional hook-up is not required. A stowed unsafe zone is defined as the area of the base plate and with the pipe handler arm 166 in a retracted position and the height of the column, plus a small additional margin. A default in-use unsafe zone includes an extension of the pipe handler arm 166 and a swept area in which the pipe handler arm 166 can move and may also include a topple area. A predefined task would be, for example in drilling and tripping-in in controlling a tail end of a stand of drill pipe to facilitate stabbing into a string of drill pipe in the well at well centre 6 and 7.

The riser handling arm skids 32 shown in FIG. 1 are each provided with the same self-propelling system, parking system, automatic hook-up system and automatic control system described with reference to the spider skid 37. The base 190 is formed in a structural X-shape lying in a horizontal plane with a planar square central portion 191 on which is a rotatably mounted horizontal telescopic riser handling arm 193 having a riser guide 194. The extendible riser handling arm 193 is hydraulically actuated and controlled from the master control computer system 100. Hydraulic power and communication lines for the extendible riser handling arm 193 is provided through an auxiliary line (not shown) on the riser handling arm skid 32, which branches from the combined hydraulic fluid supply hose and communication lines 100. Thus an additional hook-up is not required. A stowed unsafe zone is defined as the area of the base plate and with the riser handling arm 193 in a retracted position and the height of the column, plus a small additional margin. A default in-use unsafe zone includes an extension of the riser handling arm 193 and a swept area in which the riser handling arm 193 can move. A predefined task would be, for example in building and lowering a riser in controlling a tail end of a section of riser when being moved from a store to well centre 6 and 7.

The coiled tubing skid 34 shown in FIG. 1, is provided with the same self-propelling system, parking system, automatic hook-up system and automatic control system described with reference to the spider skid 37. The base 195 is generally planar, with a drum frame 196 rotatable mounted thereon. The drum frame has a drum 197 mounted therein, with a drum having a horizontal axis. The drum frame 196 is rotatably mounted on the planar base 195, such that the drum frame 196 can rotate about a vertical axis to allow coiled tubing 198 on the drum 197 to be played out perpendicularly to the axis of the drum, no matter where the coiled tubing skid is located on the network of rails 10. The drum 197 has a drive system (not shown) to help winding and rewinding. The drive system may be hydraulically actuated and controlled from the master control computer system 100. Hydraulic power and communication lines for the drive system is provided through an auxiliary line (not shown) on the coiled tubing skid 34, which branches from the combined hydraulic fluid supply hose and communication lines 100. Thus an additional hook-up is not required. A stowed unsafe zone is defined as the area in plan of the reel 197 and the height thereof, plus a small additional margin. A default in-use unsafe zone includes the area in plan of the reel when rotated, thus defining a cylindrical unsafe zone and an additional area in which the coiled tubing will be played out, such as between the coiled tubing skid and well centre. A predefined task would be, for example in a well intervention operation with a coiled tubing investor head, shown in FIG. 1 at well centre 6.

The network of rails 10 comprises track 11 to 19 in a layout which will be suitable for a rig floor on a dual derrick drill ship. A layout for other types of rigs such as a single derrick drill ship will be very similar although will have fewer track. A layout for an FPSO having a double derrick will be the same or very similar. A layout for offshore platform having a double derrick, SPAR platform, SWATH sea star platform and tensioned leg platform will be the same or very similar. Although, a skilled man will be able to draw up suitable modified layout for each type of rig. The network of rails may be simplified for a land rig, which generally has a much smaller rig floor.

It is envisaged that other items could be conveyed and used whilst remaining on the skids of the invention, such as an iron roughneck and continuous circulation tool.

Figure 15:
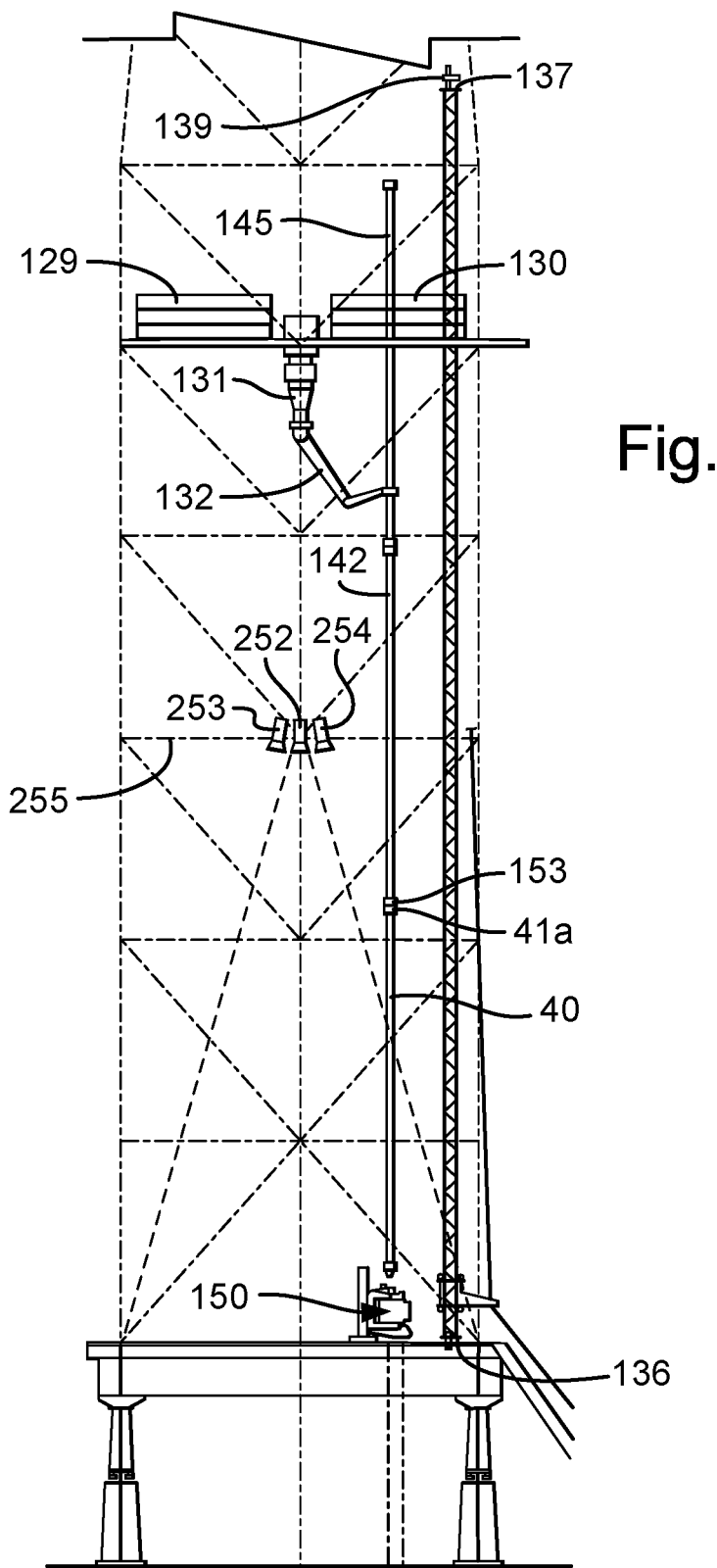
FIG. 15 is a side view of the drilling rig shown in FIG. 14 in a second stage of operation.
Figure 16:
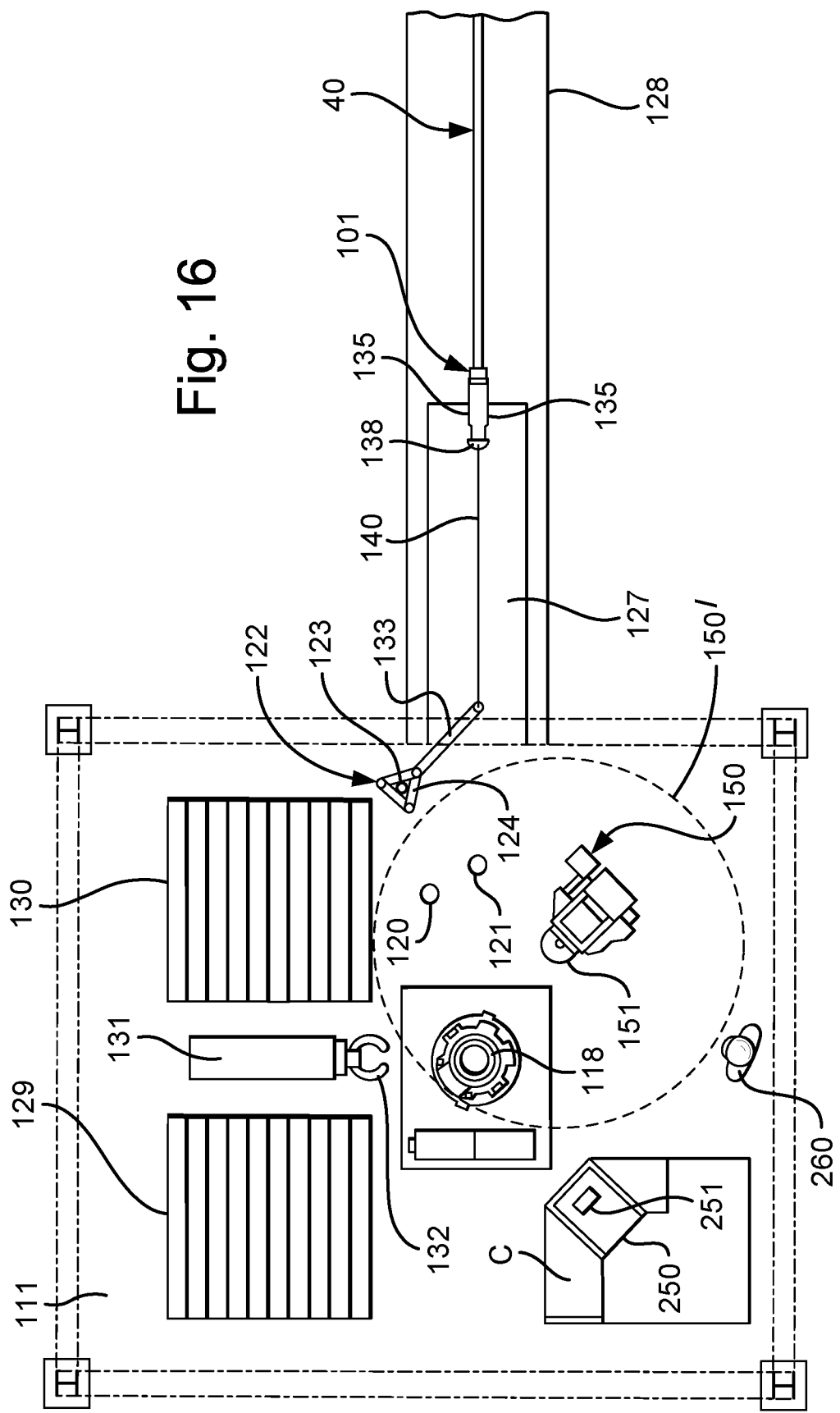
FIG. 16 is a top plan view of the rig floor and cat walk of the drilling rig shown in FIG. 14.

FIGS. 14 to 16 show schematically a land drilling rig generally identified by reference numeral 200. The drilling rig 200 comprises a derrick 110 extending upwards from a rig floor 111. A drilling hoist comprising a travelling block and a swivel and hook assembly is mounted at the upper part of the derrick, but is not shown in the drawings for clarity. A top drive unit, is mounted on a carriage so as to be displaced along a vertically extending track, is suspended by the hoist in a manner known per se, which are not shown in the drawings for clarity. The drilling hoist and the top drive unit suspended thereby are substantially aligned with a drilling opening 118, known as the well centre, defined in the rig floor 111, and the top drive unit may be brought into rotary driving engagement with the upper end of a drill string 119 extending through the drilling opening 118.

Two assembling or preparation openings 120 and 121, known as mouseholes, are defined in the rig floor 111 located in close proximity to the well-centre 118. A pipe handling apparatus for loading drill pipe and preparing stands of drill pipe is generally identified by reference numeral 122. The pipe handling apparatus 122 comprises a vertically extending frame tower 123 and a slideable carriage 124, which may be referred to as a dolly, to which is arranged an elevator 101. The pipe handling apparatus is provided in close proximity to the mouseholes 120 and 121 and an opening in the side of the derrick 110 known as a V-door 125 facilitates access to areas off the drill floor 111, including access to an access ramp 127, known as a slide, and an area for storing pipes and an access way for use in transferring the pipes from the storage areas to the platform 111, known as a catwalk 128.

The drill floor 111 further comprises finger boards 129 and 130 for setting back stands of drill pipe or bottom hole assembly parts in a vertical position defining a setback area. A pipe handling arm 131 for loading and unloading the storage areas 129 and 130 has a rotatable and extendable gripping device 132 mounted generally in the setback area between the two finger boards 129 and 130 and advantageously in the upper portion of the derrick and within the structure of the derrick 110 to provide for moving stands of pipe or joints of pipe between the well-centre, stand building mouseholes 120 and 121 and/or finger boards 129 and 130.

The rig floor further carries drawworks associated with the drilling hoist. A drillers' cabin C, known as a dog house is provided for the operator or driller to operate the pipe handling apparatus and drilling operations.

The pipe handling apparatus 122 comprises a tower 123, which is slightly taller than three joints of drill pipe. A joint of drill pipe is generally about 9.1 m (30 feet) long and so the tower 123 would be at least 30 metres tall for handling stands of three joints of pipe. The two joints of drill pipe are connected by spinning and torquing device 150, known as an iron roughneck, which is shown in more detail in FIGS. 21 and 22

The pipe handling apparatus 122 also comprises a carriage 124 having an arm 133 mounted thereon. The carriage is arranged on wheels 134 which facilitate movement of the carriage up and down the tower 123. The carriage 124 does not rotate with respect to the tower 123.

The tower 123 is mounted in lower 136 and upper 137 rotary platforms, so that the tower 123 can rotate about its longitudinal axis. The rotary platforms are driven by a hydraulic, pneumatic or electric motor and controlled from the operator or driller's cabin C. The rotary tables are arranged on bearings (not shown), and the tower could be rotated manually.

A wire 135 having eyes spliced into the wire at each end are connected at one end to the shackle 8 of the elevator 101 and another wire 135 of substantially the same type is attached to shackle 9 of the elevator 101. The other ends of the wires 135 are attached to a yoke 138. A further wire may be attached to shackle 10 to control the orientation of the single joint elevator 101 or to help take the weight of the elevator and the pipe therein and may be attached to the yoke 138. The yoke 138 is attached to the end of a wireline 135 which passes between pulley wheels 141 arranged at a distal end of the arm 133 and over a pulley 139 at the top of the tower 123 and down through the frame structure of the tower to a winch (not shown). The winch (not shown) may be controlled by the operator from the driller's cabin C.

A master computer control system 250 is located in the dog house C and is provided with a user interface, such as a touch screen 251. Three rig hand safety cameras 252, 253 and 254 are fixed to lattice members 255 of the derrick 110 at a height of approximately fifteen metres. The cameras are arranged to have a field of view of the entire rig floor 111 with as little obstruction as possible. The field of view of each camera 252, 253 and 254 overlap.

In use, a joint of drill pipe is placed on the catwalk 128. Elevator 101 fitted on to the joint. The winch (not shown) is operated to wind the wireline 140 in, pulling the elevator 1 and the drill pipe 40 engaged in therein up the ramp 128, as shown in FIG. 10. The yoke 138 engages with the arm 133 near the guide rollers 141, pulling the arm 133 and the carriage 124 up the tower 123. Once the joint of drill pipe 40 is clear of the platform 111, as shown in FIG. 11, the winch is stopped and the tower 123 is rotated on rotary tables 136 and 137 by approximately 120 degrees, so that the joint of drill pipe 40 is now in line with the first mousehole 120. The winch is operated to unwind the wireline 140 to lower the carriage 124 and the joint of drill pipe 40 into the mousehole 120. The single joint elevator 101 is disconnected, the tower 122 rotated and then tumbles down to the catwalk 128 where a second joint of drill pipe 142 has been placed in the same fashion as the first. This is repeated with a second joint, which is connected to the first at the mouse hole with an iron roughneck 150. The iron roughneck 150 is retraced on arm 152 and swung about pillar 151 to a storage position, or to be used at the well-centre 118. Once a stand 142 of two or three joints has been constructed, The winch is operated to wind the wireline 140 to lift the elevator 101 and the stand up guided by the carriage 124 out of the first mousehole 120. The tower 123 may be rotated towards a raised platform situated at the top of the fingerboards 129 and 130. A pipe handling arm 131, such as the one sold by B J Varco under the trade name VCR, grabs the triple. The derrickman on the stabbing board removes the safety locking pin 55 from the elevator 101 and pulls back on the handle 58 to release the elevator 101. Alternatively, the elevator 101 may be operated remotely. The iron roughneck 150 may be moved into alignment with the well-centre for "just-in-time" stand building operations and moved on extendible arm 151 into engagement with the drill pipes to perfect a connection with the drill string.

Drilling may be simultaneously conducted at the well-centre 118 whilst preparation of a stand of pipe or a single is transferred from the catwalk 128 or ramp 127 to the well-centre 118 and/or fingerboard, as described herein.

The cameras 252, 253 and 254 capture a master image at a rate of approximately ten master images per second and are sent electronically to the master control computer system 250 for processing in real time.

The cameras 252, 253 and 254 are preferably digital range imaging cameras, but may be analogue, the image converted to a digital file and transportation to the master control computer system 250. The cameras 252, 253 and 254 may be of the charge-coupled device (CCD) or complementary metal-oxide semiconductor (CMOS) type.

The master control computer system 250 has a memory preloaded with instructions to recognise tools and equipment on the rig floor 111. This is carried out in an identification procedure in a set-up process, which comprises taking item images of the tools and equipment, preferably with the cameras 252, 253 and 254 in the position of use in the derrick 110. The tools and equipment may be items such as an iron roughneck. Contrasts in colour, such as an outline of the tool is mapped and defined by a user as for example an iron roughneck to produce a named digital tool map. The digital tool map is then stored in an accessible memory.

The set up procedure also includes establishing an unsafe zone for each tool. A default unsafe zone is mapped by commanding the tool to carry out a full range of movement whilst capturing a series of images with the cameras 252, 253 and 254. An in-use unsafe zone is mapped by commanding a range of movements used for a specific task whilst capturing a series of images with the cameras 252, 253 and 254. For example, the iron roughneck 150 is movably arranged on a retractable arm 152 relative to a pillar 151 and can also swing thereabouts between mouse holes 120, 121 and well centre 118 when tripping-in and stand building. The iron rough neck 150 is then used whilst the cameras 252, 253 and 254 capture a series of images to be analysed by the master control computer system 250 to define an in-use unsafe zone 150' about the tool. This set up procedure may be carried out for each tool for each task.

The master image captured by cameras 252, 253 and 254 is scanned by the master control computer system 250 for items which have the same features as identified in the identification procedure. Once identified, the item is mapped on to a digital map of the rig floor 111. In this case, the iron roughneck is mapped on to the digital map, which may be displayed on visual interface 251. The pre-established unsafe zone is also mapped on to the digital map and preferably displayed on the visual interface 251.

The master control computer system 250 is also preloaded with a rig hand recognition system, which may comprise a set up procedure for recognising the outline of a rig hand 260 from above, using colour contrast. The master image is analysed by the master control computer system 250 in real time to look for rig hands 260 in the master image. If a rig hand 260 is present, a location point will be mapped on to the digital map and preferably displayed on the visual interface 251.

If the location point of the rig hand is within an in-use unsafe zone of a tool, such as the iron roughneck 251, a command will be sent from the master control computer system 250 to instruct the tool to shut down, ceasing operation and alert the driller on the visual interface 251.

Another example of a tool is the pipe handling apparatus 122 which has a cylindrical unsafe zone 122' about the tower 123. Yet another example of a tool is the pipe handling arm 131 which has a cylindrical unsafe zone about well-centre, the mouse holes and setback area.

Figure 17:
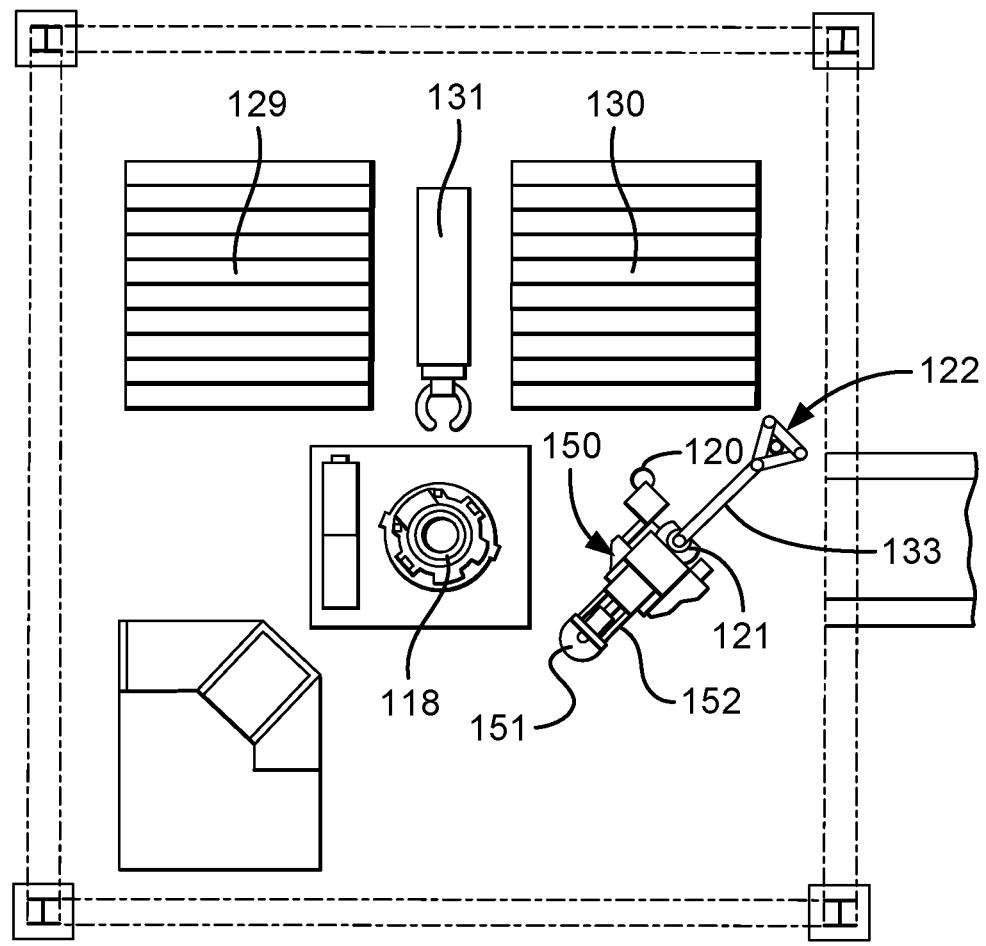
FIG. 17 is a view of the rig floor shown in FIG. 14 in a third stage of operation from the view point of a camera forming part of a system in accordance with the present invention.
Figure 17A:
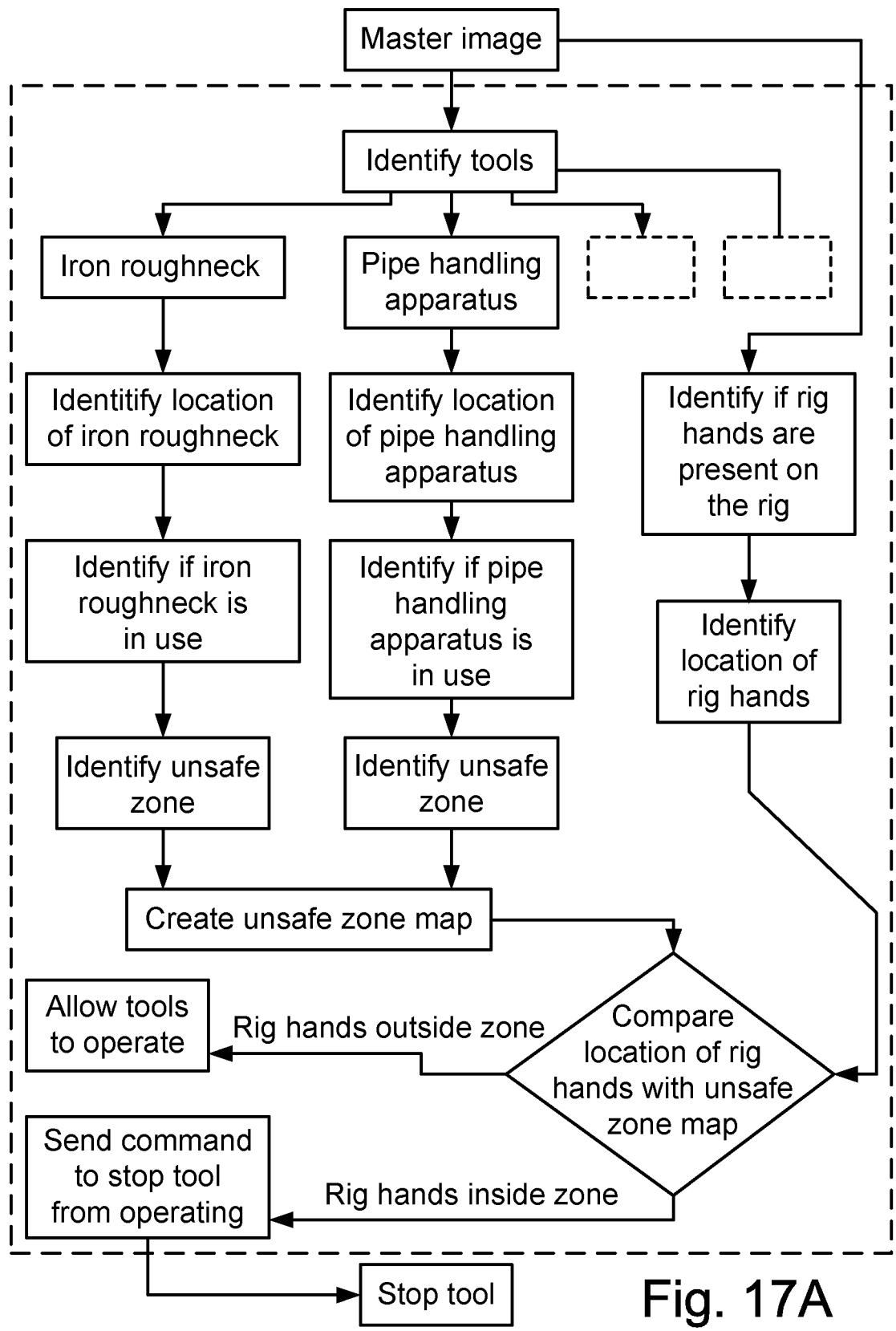
FIG. 17A is a flow diagram for a system for mitigating accidents on a rig floor.
Figure 17B:
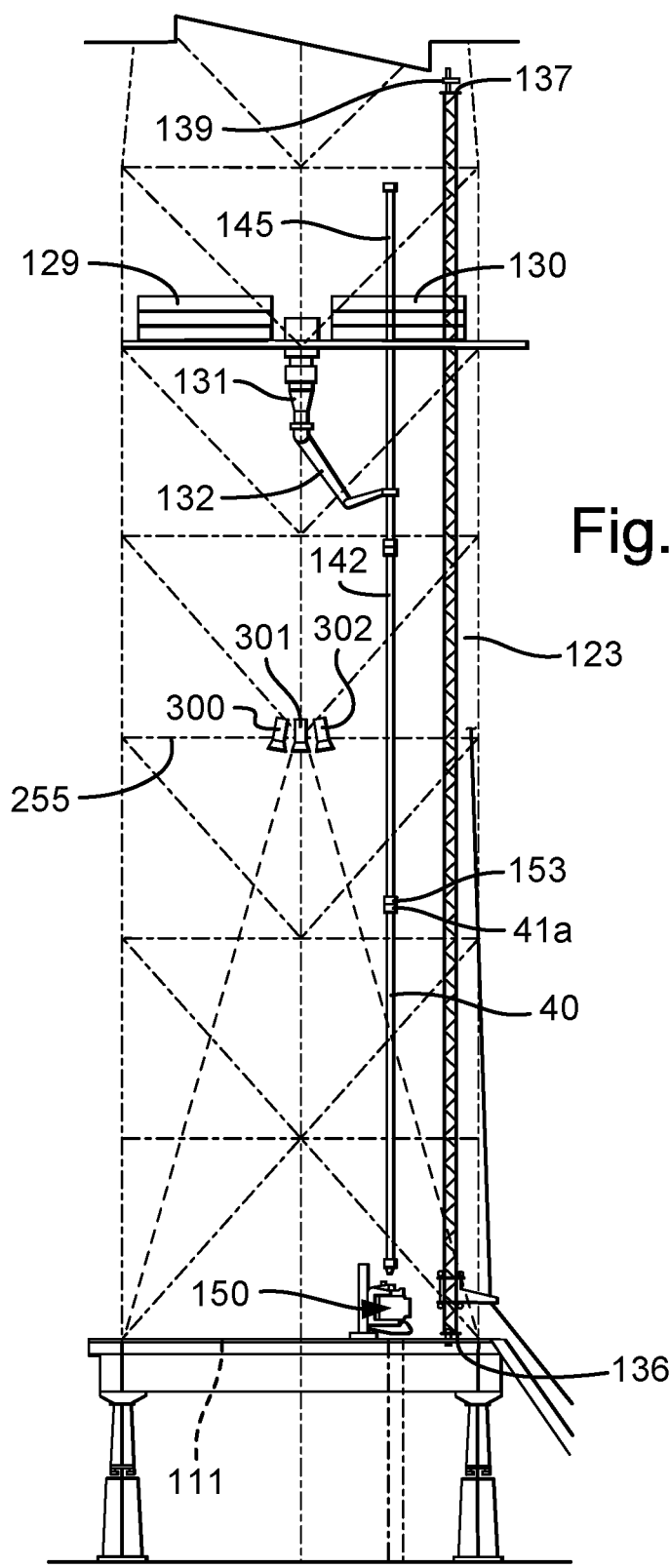
FIG. 17B is a side view of a drilling rig, like the drilling rig shown in FIG. 15 incorporating rig hand safety apparatus.

FIG. 17B shows part of a drilling rig generally similar to the drilling rig shown in FIG. 15 with like reference numerals referring to like parts. The drilling rig also comprises three rig hand safety apparatuses 300, 301 and 302 arranged above the rig floor 111 on the derrick 110. Each of the rig hand safety apparatuses 300, 301 and 302 is substantially the same as the other. Optionally, each rig hand safety apparatus 300, 301 and 302 is located approximately 5 m to 8 m above the rig floor 111 but may be arranged between 1.5 m and 12 m above the rig floor 111. Each rig hand safety apparatus 300, 301 and 302 is directed towards the rig floor 111 at a slight angle thereto and directed away from each other so that substantially all of the rig floor 111 is in within the combined field of view of the rig hand safety apparatus 300, 301 and 302. The field of view of each may overlap.

Figure 17C:
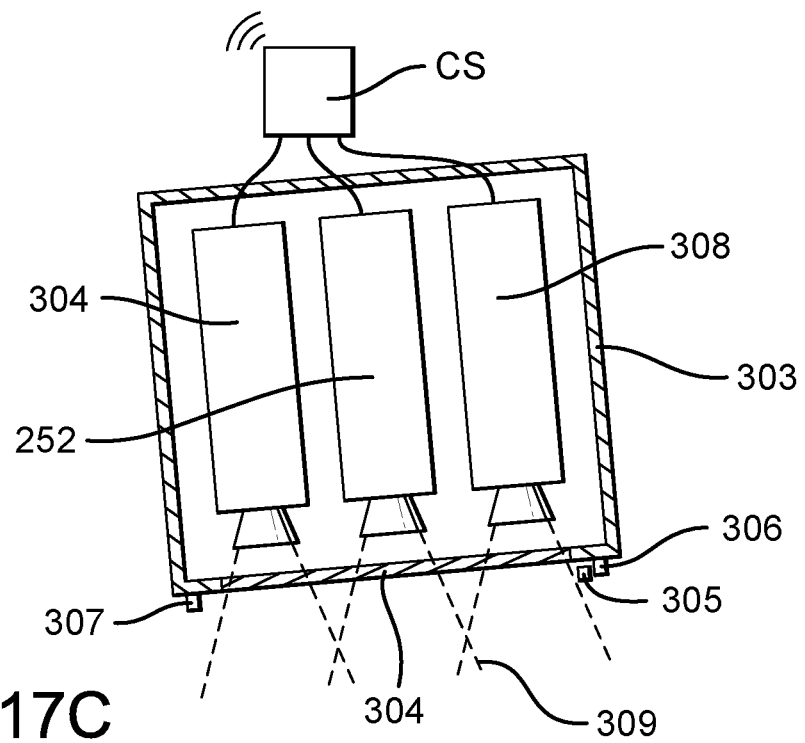
FIG. 17C is a schematic view of one of the rig hand safety apparatus shown in FIG. 17B.

FIG. 17C shows a rig hand safety apparatus 300 incorporating a rig hand safety camera 252. The rig hand safety apparatus 300 has an explosion proof housing 303 having a window 304. The window 304 is provided with a wiper 305 having a wiper motor 306 and rain sensor 307 for keeping the window 304 clean, free from rain spots and dirt. The camera 252 is located within the x-proof housing 303 and directed downwards towards the rig floor 111. A thermal imaging camera 304 is also located within the x-proof housing 303.

A light source 308 is also enclosed in the housing 303 and directed in concert with the camera 252 to illuminate the field of view 309 of the camera 252. Preferably, the light source is powerful enough to flood light on to the rig floor 111 with a light intensity of preferably at least 350 LUX at the rig floor 111. Such light intensity is sufficient to allow the reflected light to be detected by the camera 252. The light source optionally emits light over a range of wavelengths which optionally covers the range of wavelengths detectable by the camera.

The camera 252 optionally detects a range of wavelengths covering visible light and optionally infrared. The rig hands 320 optionally have markers on them which are receptive to visible and/or infrared light. For example, a reflector 310-313 such as a reflective tape supplied by 3M corporation under the Scotchlite™ brand reflective material type 3150A SOLAS Grade Pressure Sensitive Adhesive Film Silver in white or blue, which facilitates reflection of infrared light. The reflective material 310, 313 may be adhered to the helmet 315 or shoes 316 of the rig hand. The reflective material may be of a distinctive shape to distinguish it from other shapes and reflective surfaces found on a rig floor 111. The reflective material 311, 312 may be sewn, adhered or form part of overalls 317 of the rig hand, such as a rectangular strip across the back or over shoulders.

The cameras 250, 304 captures an image of the rig floor 111 and everything thereon in real time, optionally at a refresh rate of once every second. Each image is sent to the control system CS wherein an algorithm is used to analyse the image. The image is analysed by the computer system CS.

The heat sensing camera 304 identifies one or the other of inanimate objects and rig hands to differentiate the two. The master computer control system CS comprises an algorithm for filtering out parts of the obtained images which are not likely to be rig hands. The structure of the drilling rig including lattice members 255 have a heat signature which is very different to that of a rig hand 320 and thus the master computer control system CS filters out large parts or all of the image. Certain movable machines, such as an iron roughneck 150, has a heat signature which is very different to that of a rig hand 320 and thus the master computer control system filters out large parts or all of the image. Furthermore, certain known items are static and always present of a rig floor, such as a derrick 110 and tower 139. Details of these known items may be contained in a known items database. The master computer control system CS may be provided with an additional algorithm to filter out parts of the image of those details held in the known items database. The parts of the image that are left are then analysed using further algorithms. The master computer control system may further comprise a database of known heat signature profiles for machines or any other object likely to be found on a rig floor. The master control computer system may be provided with an algorithm to compare the obtained heat signature profiles with those in the database to discount them from being a rig hand 320.

Rig hands 320 generally have an identifiable heat pattern signature. The master computer control system CS is optionally provided with an algorithm to assess if there is a heat pattern which is indicative of a rig hand. The master computer control system CS is also provided with an algorithm to assess the location of the heat pattern indicative of a rig hand 320 on the rig floor 111.

Rig hand 320 has certain identifiable signatures which do not vary considerably from one rig hand 320 to another. Such a feature is the helmet 315. Another feature is the face 319 of the rig hand 320. The system uses camera 252 for receiving reflected light information to assess a signature shape of at least part of the rig hand 320, such as a helmet 315 or face 319.

If the two results (light and heat sensing) are positive, it is highly likely that the master computer control system CS has identified a rig hand 320. If only one of the light image camera 252 and heat sensing camera 304 identifies a rig hand 320, the system assumes there is indeed a rig hand 320 in that location. In this way, the system has more redundancy and less likely to allow an operation within an unsafe zone to be carried out.

Figure 17D:
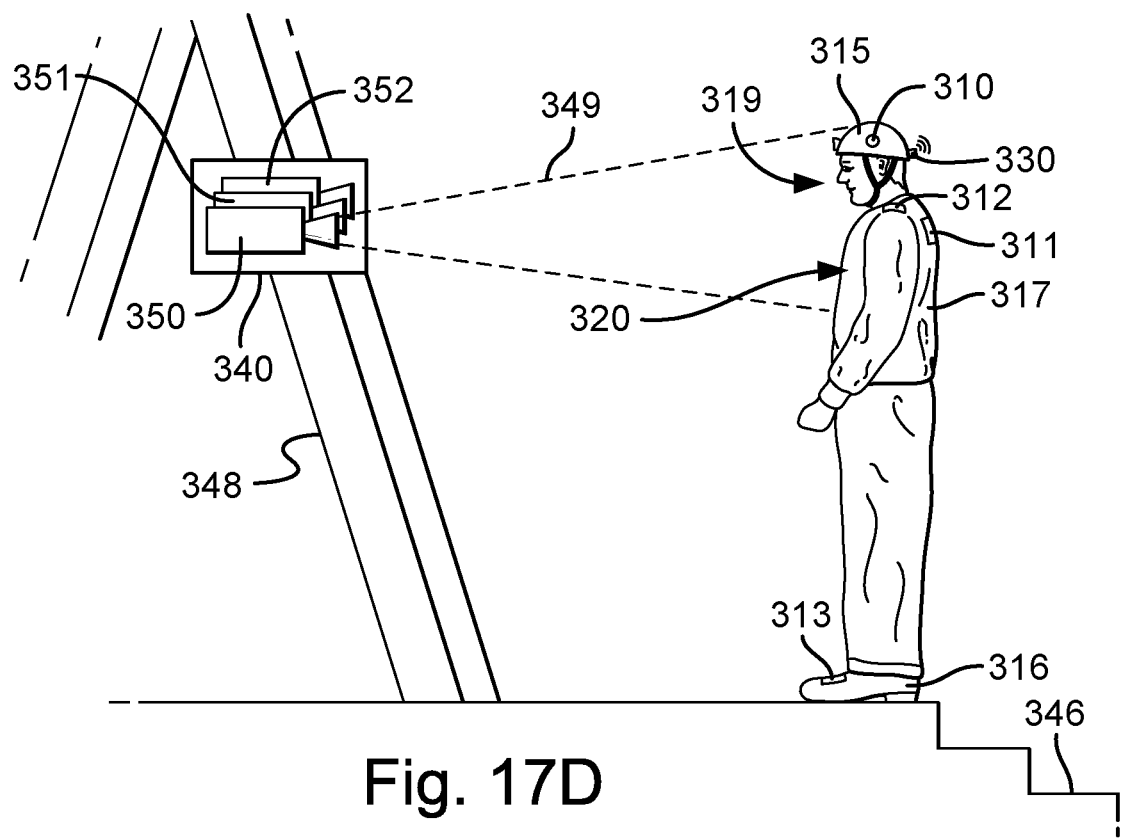
FIG. 17D shows a part of a rig floor area provided with a further embodiment of a rig hand safety apparatus of the present invention.
Figure 17E:
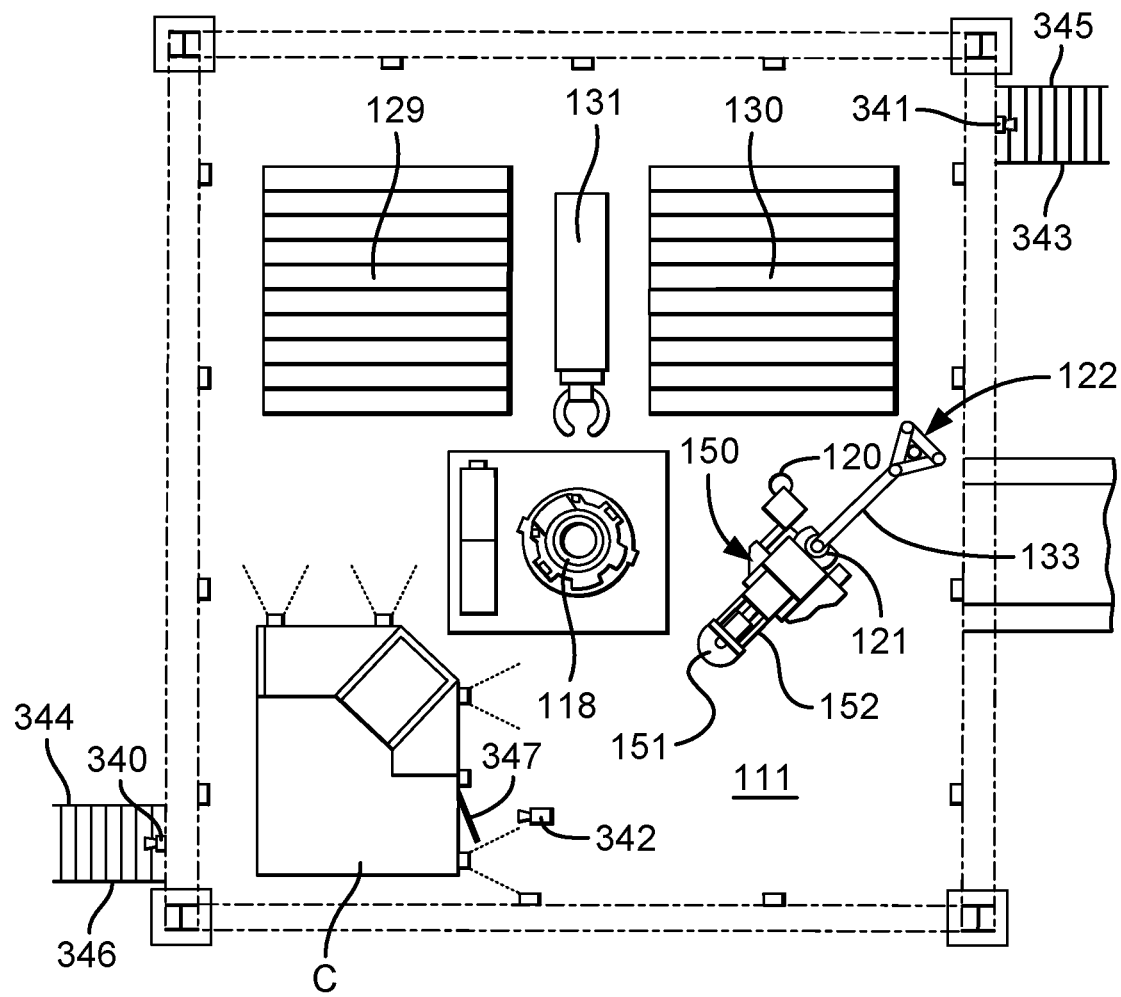
FIG. 17E shows a plan view of a rig floor provided with a multiplicity of rig hand safety apparatus of the type shown in FIG. 17D.

Referring to FIGS. 17D and 17E an entrance camera unit 340, 341, 342 is located at every entrance point 343, 344 to the rig floor 111. The drilling rig shown in FIG. 17E, has two sets of stairs 345, 346 leading up to the rig floor 111 and one door 347 to dog house C thus there are only are three entrances to the rig floor 111. Each entrance camera unit 340, 341, 342 is attached to rig structure 348 and arranged to have a field of view 349 directed at the rig hand 320. Each entrance camera unit 340, 341, 342 is substantially the same as the other. Entrance camera unit 340 is shown in FIG. 17D, which comprises a camera 350 and a light source 351 to illuminate the rig hand 320. The camera 350 captures an image of the rig hands 320.

The master computer control system CS is provided with an algorithm for identifying a common feature of the rig hand 320 such as helmet 315. In this way, the master computer control system CS can differentiate a rig hand 320 passing through the entrance 344 from an item passing through the entrance 344. Optionally, the camera 250 is directed at the rig hand's face, so that the rig hand's face is in the field of view of the camera 250. The master computer control system CS is provided with a face recognition algorithm for identifying the rig hand 320.

The master computer control system is provided with an algorithm to keep a tally of rig hands on the rig floor. The tally may simply be the number of rig hands on the rig floor. Optionally, the camera located at every entrance to the rig floor has a field of view directed at the rig hand's head.

In this way, the tally recorded by the master computer control system also includes a list of names of rig hands on the rig floor.

Optionally, the master computer control system CS also comprises an algorithm to compare the tally with the number of rig hands 320 located using the system of the invention on the rig floor 111. If the numbers are not equal, a further rig hand's signature is looked for or the tool pusher or driller is alerted. The master computer control system CS may also be provided with the number of helmet location devices 330 active on the rig floor 111 as a further check. The helmet location device 330 comprises a locator and a transmitter for transmitting a location signal of the helmet 315 back to the master control computer CS.

Figure 18:
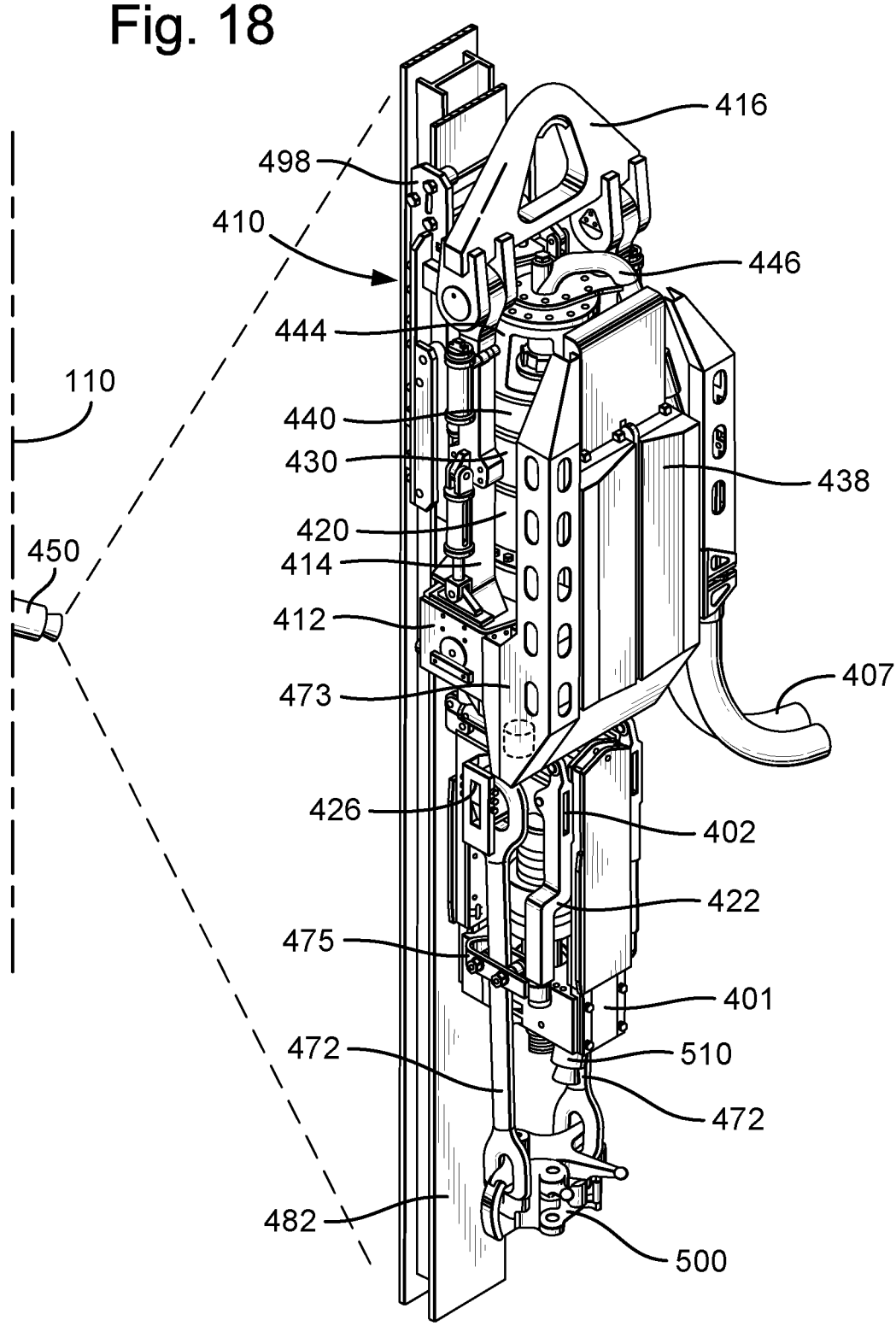
FIG. 18 is a perspective view of a top drive system of the present invention on a track forming part of the derrick shown in FIG. 14, the top drive system comprising an elevator system in accordance with the present invention.
Figure 19:
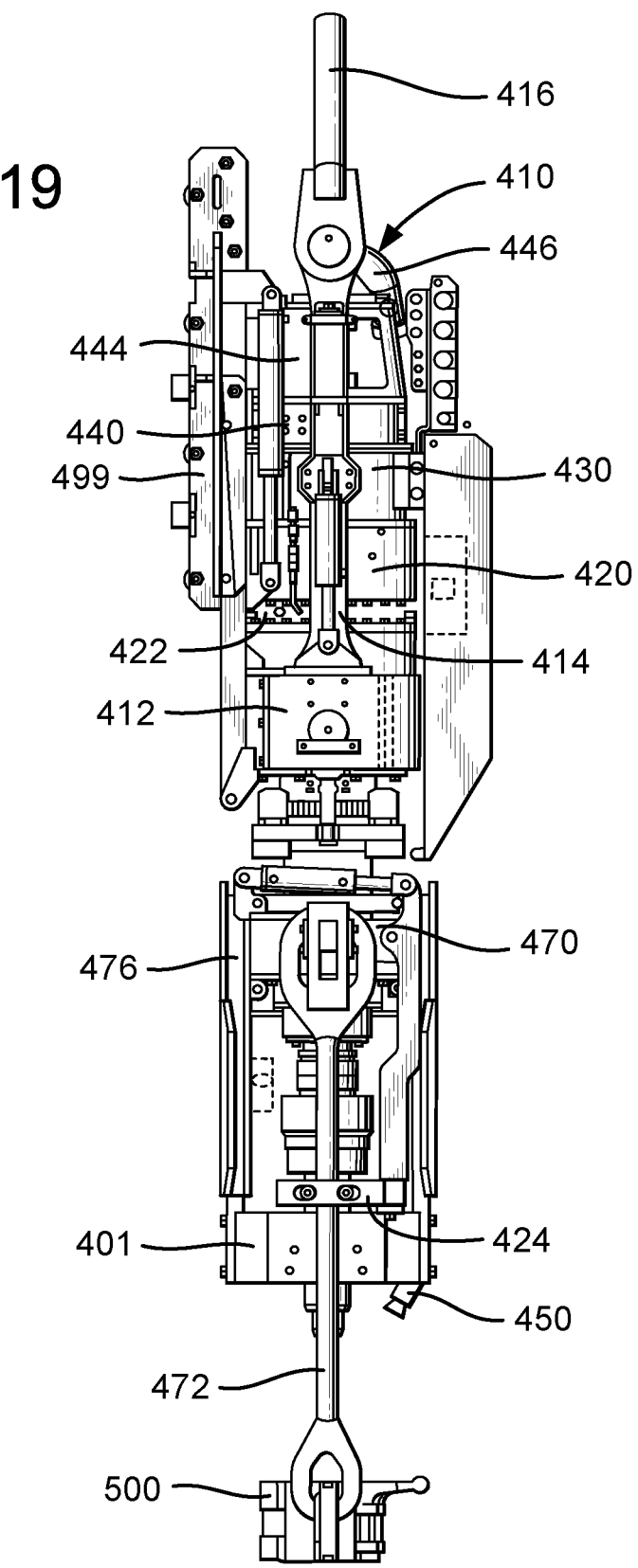
FIG. 19 is a side view of the top drive system shown in FIG. 18.

Optionally or additionally, each entrance camera unit 340, 341, 342 comprise a thermal imaging camera 352. The thermal imaging camera 352 sends a thermal image pattern of any object or rig hand passing through the entrance 343, 344, 347. The thermal image pattern is sent to the master computer control system CS, which runs an algorithm to assess if the object or rig hand is a rig hand 320. FIGS. 18 and 19 show a top drive system 410 according to the present invention with a becket 416. The top drive system 410 has a swivel body 412 suspended with links 414 from the becket 416. The becket 416 is connected to a travelling block (not shown). A gear system 420 is mounted on a spacer plate 422 which is supported by the swivel body 412. A motor 430 is coupled to the gear system 420. A brake system 440 connected to the motor 430 is within a bonnet 444 through which extends a gooseneck 446 connected to a kelly hose 407 through which flows drilling fluid. An extension system 498 provides horizontal displacement of the top drive system 410. A gripping system 401 for selectively gripping tubulars is suspended from a load collar 470. Links 472 suspend an elevator 500 from the load collar 470. A counterbalance system (which can hold the weight of the entire system 410 during stabbing of tubulars) includes load compensators. A link tilt system 402 provides selective tilting of the links 472 and thus selective movement and tilting of the elevator 500 and movement of a tubular or stand of tubular supported by the elevator 500 to and away from a wellbore centerline. Bail retainers 475 retain the links 472 on the load collar 470. Link tilt hydraulic cylinders 476 are interconnected pivotably between the load collar 470 and arms 422. Each connector 424 is pivotably connected to a lower end of an arm 422 and to a clamp 426 which is clamped to a link 472. Guards 473 and 490 are on sides of an access platform 438. The top drive system 410 can be movably mounted on a beam 499 (or "torque tube"). Horizontal displacement is provided by the extension system 498 which includes a torque bushing 98a. The extension system 98 with the top drive system attached thereto is movable vertically on the beam 482 with the top drive system attached thereto.

A health check camera 450 is fixed to a strut of derrick 110 which has a field of vision encompassing a side profile of the top drive system 410. Thus the health check image preferably includes the becket 416, goose neck 446, motor 430, gearbox 420, rams, links 472, elevator 500, load collar 470, extension system 498, gripper 401 and guards 473.

The health check camera 450 captures a health check image of the side profile of the top drive system 410 and sends the health check image to the master control computer system 250. More than one health check camera may be used with overlapping images, which are collated by the master control computer system into one master health check image.

The health check image is captured when the top drive system is located along track 482 in direct view of the camera 450. The camera 450 is preferably placed at a point having a field of vision of the top drive when the top drive system is stationary for a time which allows a good quality image to be captured, such as where the top drive is stationary immediately prior to connection to a drill string, a default rest location or at a top point along the track where the top drive system changes direction of travel along the track 482.

Alternatively, the camera 450 is mounted on a track which allows the camera to move in concert with the top drive system 450 or is located on an arm extending out from the top drive system 410.

A reference top drive side view image is stored on the master computer control system 250. The reference top drive side view image is preferably taken by the camera 450 from the same fixed point on the derrick of a previously manually inspected view to ensure the reference image is of the top drive system 410 in full working order. The working top drive side view image is compared to the reference top drive side view image. If the working top drive side view image is significantly different to the reference top drive side view image, the master computer control system 250 sends a signal to a top drive system controller to cease operations.

As an additional step or an alternative to the cease operation command, a signal is sent to an operative in accordance with a health check system, as set out below. If the reference top drive side view image is substantially the same as the working top drive side view image, the master computer control system 250 sends a signal to the top drive system controller (not shown) allowing continued operation of the top drive system 410.

In order to assess if the difference is substantial, the master control computer system 250 applies a number of algorithms to the difference such that differences caused simply by mud or scratched paint are ignored, and that differences, such as a crack, loose bolt, sheared bolt, deformation of stressed members or leaking ram are noticed as substantial differences. Using a range imaging camera an assessment for a loose bolt can be made and size and depth of crack using absolute distances or relative distance measurements between entrance to depth of crack and distance between bolt head and substrate. A colour check is also used to assess if the difference is substantial, for instance a red-brown colour would indicate mud, a dull silver would indicate a scratch and a bright faceted silver would indicate a crack. A contrast about an outline of the top drive system and parts thereof, such as bails, links and rams and a change in the outline may indicate deformation.

Preferably, various parts of the top drive system are of a contrasting colours.

Further health check cameras may be located above, below, behind, in front and on an opposing side the top drive system.

Figure 20:
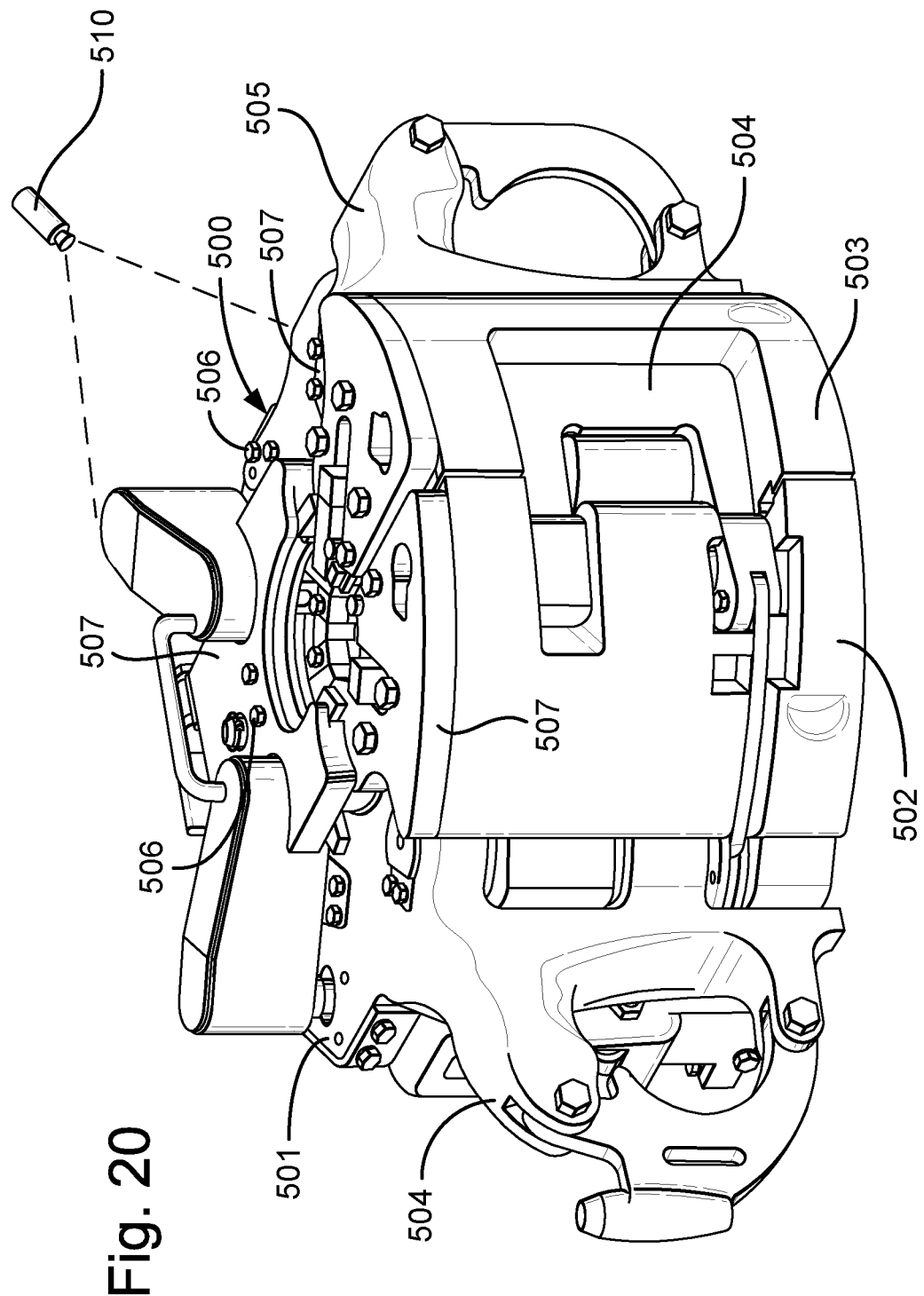
FIG. 20 is a perspective view of the elevator system as shown in FIG. 18.

Referring to FIG. 20 there is shown an elevator system comprising an elevator 500 comprising a main body 501, doors 502 and 503, a latch 504 between the two doors 502 and 503. The main body 501 has opposing ears 504 and 505. A multiplicity of bolts 506 fix respective plates 507. A health check camera 510 is fixed to the top drive system 400 with a top of the elevator 500 in a field of view.

A reference elevator top view image is stored on the master computer control system 250. The reference elevator top view image is preferably taken by the camera 450 from the same fixed point on the top drive system of a manually inspected elevator to ensure the reference image is of the elevator 500 in full working order. The working elevator top view image is compared to the reference elevator top view image. If the working elevator top view image is significantly different to the reference elevator top view image, the master computer control system 250 sends a signal to a top drive system controller to cease operations.

As an additional step or an alternative to the cease operation command, a signal is sent to an operative in accordance with a health check system, as set out below. If the reference elevator top view image is substantially the same as the working elevator top view image, the master computer control system 250 sends a signal to the top drive system controller (not shown) allowing continued operation of the top drive system 410.

In order to assess if the difference is substantial, the master control computer system 250 applies a number of algorithms to the difference such that differences caused simply by mud or scratched paint are ignored, and that differences, such as a crack, loose bolt, sheared bolt or deformation of stressed members are noticed as substantial differences. Using a range imaging camera an assessment for a loose bolt can be made and size and depth of crack using absolute distances or relative distance measurements between entrance to depth of crack and distance between bolt head and substrate. A colour check is also used to assess if the difference is substantial, for instance a red-brown colour would indicate mud, a dull silver would indicate a scratch and a bright faceted silver would indicate a crack. A contrast about an outline of the top drive system and parts thereof, such as bails, links and rams and a change in the outline can be used to check for deformation.

Figure 21:
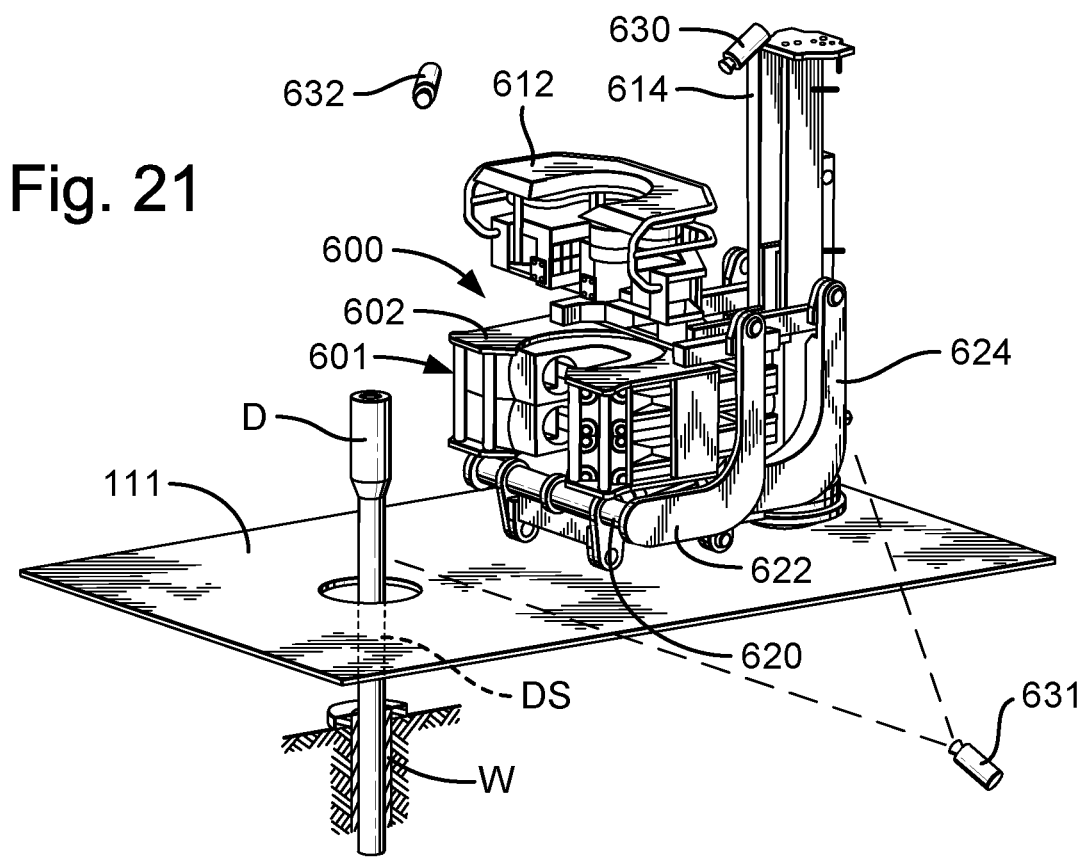
FIG. 21 is a perspective view of an iron roughneck system in accordance with the present invention, having an iron roughneck at well centre with an iron roughneck handling arm in a retracted position.
Figure 22:
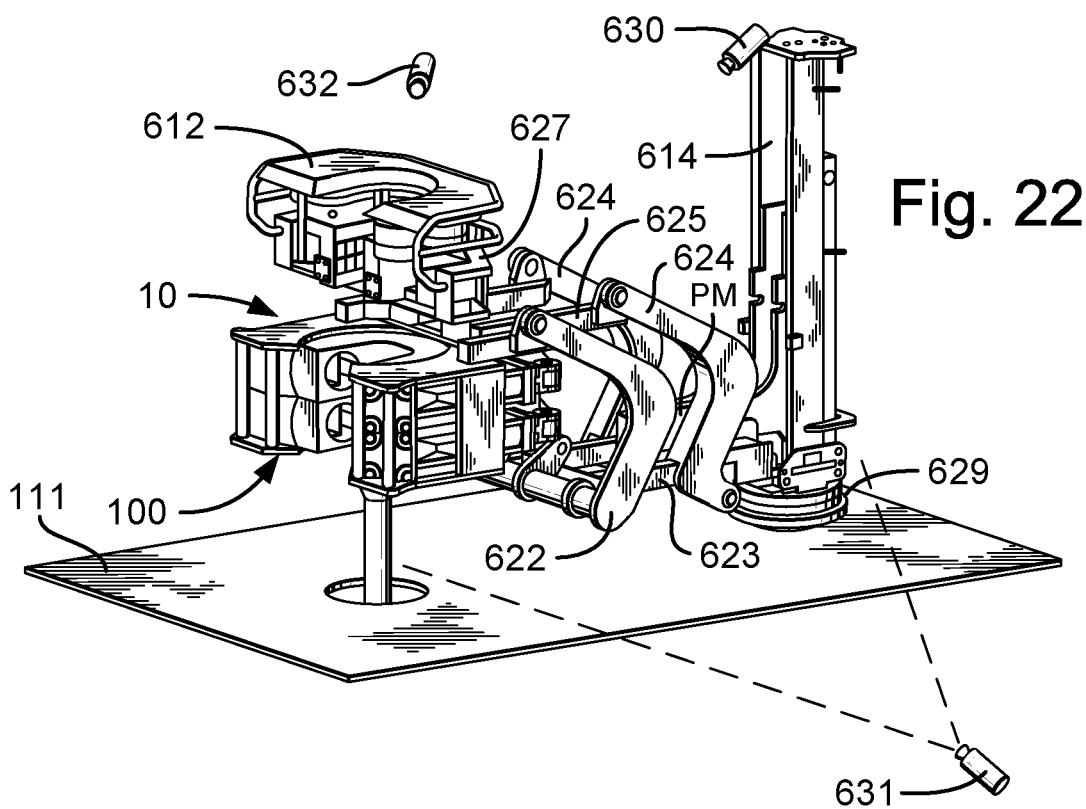
FIG. 22 is a perspective view of the iron roughneck system shown in FIG. 21 with the iron roughneck handling arm in an extended position.

FIGS. 21 and 22 show an iron roughneck system 600 in accordance with the present invention comprising an iron roughneck 601, showing a first step in the operation of connecting drill pipe. The iron roughneck 601 is arranged on a carriage 620 which is movably connected for up/down vertical movement to a pillar 614 and which can also translate horizontally on a rig floor 111 for movement toward and away from a drill pipe D of a drill string DS in a well W. The drill string D is at well centre. Support arms 622 each side of the apparatus 10 and two support arms 624 are pivotably connected at one end to a base 23 of the carriage 620 and at their other ends to a support 625. Optionally, only one support arm is used or two arms in parallel are used. The pillar 614 is arranged on a rotatable platform 629 on rig floor 111.

The iron roughneck 610 has a torque wrench 602 and a spinner 612 connected to a spin wrench carriage 627 and arranged on the support 625 and, are movable by a power mechanism PM toward and away from the pillar 614 by moving the support arms 622, 624. A console CS communicates by wire or wirelessly with the torque wrench 602, carriage 625 and spinner 612 and/or is located remotely from it, such as from the dog house C. The iron roughneck 610 is able to move horizontally using foldable arms in the form of an expandable and contractable parallelogram structure and vertically on the pillar 614 and is movable simultaneously so that the spinner and torquing apparatus can be aimed at a specific point and move in a vertical plane to the joint which saves time.

A health check camera 630 is mounted on top of pillar 614 with a field of view of the top of iron roughneck 601. A health check camera 631 and 632 is mounted either side of the iron roughneck 601 on a part of derrick 110 having a field of view of each side of the iron roughneck 601.

A multiplicity of reference top drive side view image is stored on the master computer control system 250 of the iron roughneck 601 in a stationary position. The reference iron roughneck 601, top and side view images are preferably taken by each camera 630, 631 and 632 from the same fixed point on the pillar 614 and derrick 111 of a previously manually inspected view to ensure the reference image is of the iron roughneck 601 in full working order. The working iron roughneck 601 top and side view images is compared to the reference iron roughneck 601 top and side view images. If the working iron roughneck 601 top and side view image is significantly different to the reference iron roughneck 601 top and side view images, the master computer control system 250 sends a signal to a iron roughneck 601 system controller to cease operations.

As an additional step or an alternative to the cease operation command, a signal is sent to an operative in accordance with a health check system, as set out below. If the reference iron roughneck 601 top and side view images are substantially the same as the working iron roughneck 601 top and side view images, the master computer control system 250 sends a signal to the iron roughneck 601 system controller (not shown) allowing continued operation of the iron roughneck 601.

It is envisaged that other equipment may be monitored for health checks using cameras preferably to create a 3D digitised image, such as travelling blocks and crown blocks, which are not easy for rig hands to access for manual checks. A flow diagram is shown in FIG. 23 which sets out a series of steps carried out to carry out a health check of the present invention.

The master control computer system 100 and 250 decides which operative to send a signal using a hierarchical management system of the type disclosed in WO 2004/012040 which discloses a method for controlling operation of a drilling rig using a control management system for controlling a resource module, the method comprising the steps of:
    a) programming said control management system with at least one set of operating parameters, said at least one resource module having at least one operating model having at least one set of programmed operating rules related to the at least one set of operating parameters;
    b) providing access to a plurality of users;
    c) providing a set of authenticating rules to authenticate at least one user;
    d) providing hierarchical access to said at least one user to said at least one resource module;
    e) allowing said at least one user, to input an adjusted value for at least one of the set of operating parameters in the at least one resource module;
    f) comparing said adjusted value to said at least one set of programmed operating rules and allowing adjustment if said adjusted value is within said operating rules;
    g) providing an indication if said adjusted value is not within said operating rules; and
    h) providing a supervisor override to prevent acceptance of said adjusted value.

A health check system is disclosed in WO 2004/044695, which discloses a method for monitoring and analysing a plurality of signals from monitors on at least one first drilling rig of a plurality of drilling rigs, the method comprising: providing a plurality of monitors for monitoring a status of a first drilling rig in a system of a plurality of drilling rigs; monitoring with the plurality of monitors information indicative of events at the first drilling rig; transmitting signals from the monitors indicative of the information to a processor on the first drilling rig, the processor including a set of health check rules for health checks comprising logical rules, inputs and outputs for defining events associated with the status of the first drilling rig; determining with the processor a severity code for each event; reporting the events and severity codes with the processor to a central server, the events reported by the processor to the central server in a protocol defining a data structure, the data structure comprising a hierarchical tree node structure wherein results from application of the health check rules are a bottommost node of the tree node structure; and displaying the event severity codes on a display.

Thus the invention provides a smart floor, a derrick system for zone management for clash avoidance and to reduce the likelihood of items being dropped.

The invention resides in using camera technology to create a 3D realtime model of the drillfloor derrick system and use this 3D realtime model as a basis for the zone management system. This will also not only fixed installed machines in the rig floor and derrick area to be part of a zone management system but also any equipment or human that is entering this area. Also the 3D real time model will be compared to the original 3D model of the equipment and will be used to check for deviations and abnormalities and would serve as an early warning for potential for dropped parts thereof of items held by the equipment.

This means that any additional machines or humans are not included in the zone management system.

Safe Derrick System will be based on a 3D realtime model being created from the camera covering the areas and this 3D model will be used to allow the movements or not in the area. Also to the 3D model will be used to check for abnormalities on the machines or in the system in order to prevent DROPS or other unintended events.

Cameras will be placed in the area to provide sufficient info to re-create a 3D image of the rig floor and derrick areas, from the cameras a realtime 3D model of the area will be created and used to product if a movement of the machine is safe or not. This will also allow temporary equipment and humans in the area to be part of the zone management system. The 3D model will be coupled with the rig control system to have control/verification of movements, speeds etc.

The system will also be used to verify exterior of the machines original shape, this can be used to give warning on potential loose items and deformation on the machines and prevent potential dropped items and other unsafe events.

Preferably, data obtained from the images are mapped into a three dimensional representation of the rig floor at the time. A minimum of one image is required; however more are combined to increase the robustness and certainty of the results.

In another embodiment, an articulated mount for the camera is activated based on desired views and positioning of other movable tools. The articulated mount will go to predefined positions according to the finger configuration the column racker will face at the time. Some models and/or fingerboard configurations would not require additional degrees of freedom.

A camera may be mounted on a dedicated movable track.

In a particular embodiment a non-contact range sensor is used in addition or in substitution to the image-based recognition system. The sensor comprises a laser or sonar for the creation of a three dimensional representation of the equipment on and around the rig floor.

The invention claimed is:

1. A system for operating a drilling rig, the system comprising:
    a drilling rig having a rig floor and a derrick;
    a master control computer system; and
    at least one camera, the at least one camera being adapted to capture a master image of at least a portion of the rig floor and send the master image to the master control computer system, the master control computer system being adapted to map said master image into a model of the rig floor and derrick and fixed installed machines in the rig floor and in an area about said derrick in the master control computer system to facilitate control of items on said drilling rig, wherein the master image comprises a color or grey-scale contrast, wherein the master control computer system executes an algorithm to analyze said contrast in said master image to produce an outline to detect the presence of a rig hand and maps a location point for any located rig hand into the model to provide an updated model, the master control computer system having a stowed unsafe zone and an in-use unsafe zone stored in the master control system for each item on the drilling rig and a map of unsafe zones about said items, the master control computer system establishing if each item is stowed or in-use, assessing if the rig hand is within said stowed unsafe zone or said in-use unsafe zone and, based on said assessment, allowing or disallowing at least one of said items to operate in or be conveyed into said unsafe zone.

2. The system of claim 1, wherein the master image is constructed from a plurality of sub-images, each sub-image captured by a camera.

3. The system of claim 1, wherein the master image is analyzed by the master control computer system to obtain a three dimensional model.

4. The system of claim 1, wherein the master image comprises a grey scale contrast.

5. The system of claim 1, wherein the master image comprises a color contrast.

6. The system of claim 1, wherein the at least one camera is a range imaging camera that is adapted to capture range data that is used to define points to construct said model.

7. The system of claim 1, wherein the master control computer system is adapted to construct the model in real-time with a refresh rate.

8. The system of claim 1, wherein said master control computer system is adapted to analyze said image to identify said items on said rig floor and to locate said items on said map of unsafe zones.

9. The system of claim 8, wherein, during said analysis of said image to identify said items on said rig floor, said master control computer system is adapted to scan the image for item images which are stored in a memory.

10. The system of claim 1, wherein at least one of the plurality of cameras is a visible light camera.

11. The system of claim 1, wherein said master control computer system comprises an algorithm to look for a rig hand feature, said rig hand feature including at least one of a helmet, face or facial features.

12. The system of claim 1, wherein at least one of the plurality of cameras is one of a thermal imaging camera and a thermal imaging camera provided with a range imaging device.

13. The system of claim 12, wherein said master control computer system comprises an algorithm to look for thermal image patterns corresponding to rig hands.

14. The system of claim 12, wherein said master control computer system comprises an algorithm to filter out thermal image patterns which do not correspond to rig hands.

15. The system of claim 1, wherein said master control computer system comprises a known item database and an algorithm to filter out known items.

16. The system of claim 1, wherein the rig floor comprises a plurality of entrance points further comprising at least one camera located with a field of view directed at each entrance point of the plurality of entrance points to obtain entrance point images of rig hands passing through said each entrance point.

17. The system of claim 16, wherein said master control computer system is adapted to receive said entrance point image from said at least one camera and to execute an algorithm to assess when a rig hand enters or exits said entrance point.

18. The system of claim 17, wherein the master control computer system is adapted to maintain a tally of rig hands on the rig floor.

19. The system of claim 16, wherein said master control computer system is adapted to receive said entrance point image from said at least one camera and to execute a facial recognition algorithm to assess the name of a rig hand entering or exiting said entrance point.

20. The system of claim 1, wherein said drilling rig is one of: a drill ship; FPSO; SWATH; tensioned leg platform; and land rig.

* * * * *

UNITED STATES PATENT AND TRADEMARK OFFICE
CERTIFICATE OF CORRECTION

PATENT NO. : 10,961,825 B2  
APPLICATION NO. : 15/526616  
DATED : March 30, 2021  
INVENTOR(S) : Rosano et al.

Page 1 of 1

It is certified that error appears in the above-identified patent and that said Letters Patent is hereby corrected as shown below:

On the Title Page

In item (73), in "Assignee", in Column 1, Line 1, delete "VARGO" and insert --VARCO-- therefor On page 2, in Column 2, under "Other Publications", Line 13, delete "Interantional" and insert --International-- therefor Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*